US009869879B2

(12) United States Patent
Matsumoto et al.

(10) Patent No.: US 9,869,879 B2
(45) Date of Patent: Jan. 16, 2018

(54) OBJECTIVE LENS AND MICROSCOPE

(71) Applicant: Nikon Corporation, Minato-ku, Tokyo (JP)

(72) Inventors: Miho Matsumoto, Tokyo (JP); Kotaro Yamaguchi, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/111,243

(22) PCT Filed: Jan. 9, 2015

(86) PCT No.: PCT/JP2015/000091
§ 371 (c)(1),
(2) Date: Jul. 13, 2016

(87) PCT Pub. No.: WO2015/107881
PCT Pub. Date: Jul. 23, 2015

(65) Prior Publication Data
US 2016/0334634 A1 Nov. 17, 2016

(30) Foreign Application Priority Data
Jan. 15, 2014 (JP) .................................. 2014-005362

(51) Int. Cl.
*G02B 27/42* (2006.01)
*G02B 27/00* (2006.01)
(Continued)

(52) U.S. Cl.
CPC ....... *G02B 27/4205* (2013.01); *G02B 5/1814* (2013.01); *G02B 21/02* (2013.01); *G02B 27/0068* (2013.01)

(58) Field of Classification Search
CPC ........... G02B 9/10; G02B 9/64; G02B 21/028
(Continued)

(56) References Cited

U.S. PATENT DOCUMENTS

2011/0090565 A1* 4/2011 Yoshida ............... G02B 21/02
359/576
2011/0102899 A1* 5/2011 Taeko .................. G02B 21/02
359/576

(Continued)

FOREIGN PATENT DOCUMENTS

EP       0 226 450 A2    6/1987
JP       H10-133118 A    5/1998
(Continued)

OTHER PUBLICATIONS

International Search Report from International Patent Application No. PCT/JP2015/000091, dated Mar. 31, 2015.
(Continued)

*Primary Examiner* — Kimberly N Kakalec
(74) *Attorney, Agent, or Firm* — Shapiro, Gabor and Rosenberger, PLLC

(57) ABSTRACT

An objective lens (OL) according to the present invention comprises, in order from an object side, a first lens group (G1) having positive refractive power, and a second lens group (G2) having negative refractive power. The first lens group (G1) comprises a positive meniscus lens (L1) having a concave surface facing the object side, a positive lens (L2) dispose close to an image of the positive meniscus lens (L1), and a diffractive optical element (DOE) having a diffractive optical surface (D). The second lens group (G2) is composed of three cemented lenses (CL21 to CL23) which are configured with a positive lens and a negative lens cemented each other. When d00 denotes a distance from the object side to the positive meniscus lens (L1), and TL0 denotes a distance from the object side to the objective lens rear end surface, $0.11 \leq d00/TL0 \leq 0.19$ is satisfied.

27 Claims, 18 Drawing Sheets

(51) Int. Cl.
*G02B 5/18* (2006.01)
*G02B 21/02* (2006.01)

(58) Field of Classification Search
USPC .................................. 359/657–658, 759, 795
See application file for complete search history.

(56) References Cited

U.S. PATENT DOCUMENTS

2013/0135739 A1    5/2013  Toshi et al.
2013/0148202 A1    6/2013  Yoshida

FOREIGN PATENT DOCUMENTS

JP           2010-066445 A      3/2010
WO     WO 2011/158778 A1      12/2011
WO     WO 2012/026239 A1       3/2012

OTHER PUBLICATIONS

English Translation of International Preliminary Report on Patentability from International Patent Application No. PCT/JP2015/000091, dated Jul. 28, 2016.
Extended European search report for European Patent Application No. 15737629.4, Aug. 17, 2017.

* cited by examiner

[FIG.1]
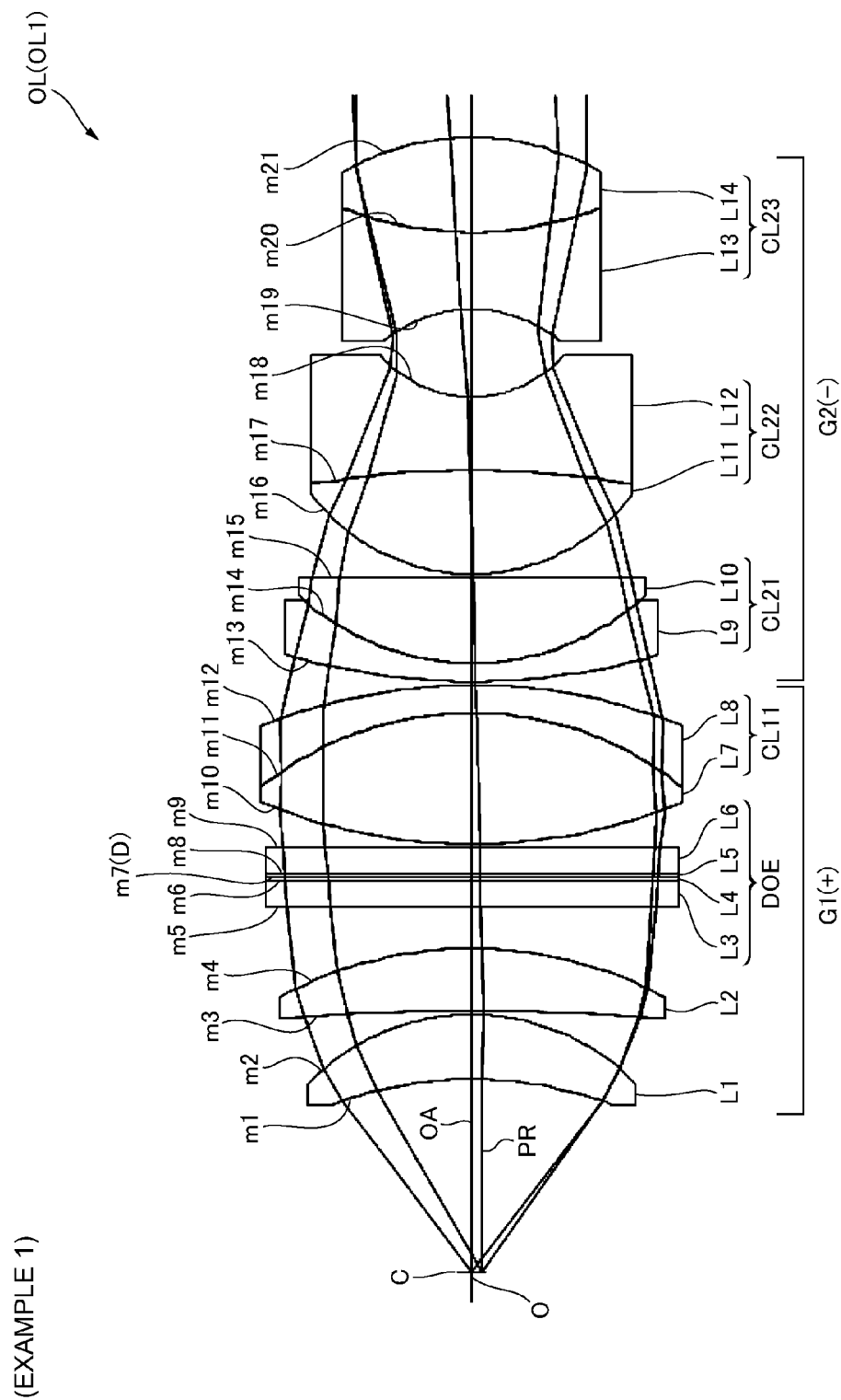
(EXAMPLE 1)

[FIG.2]
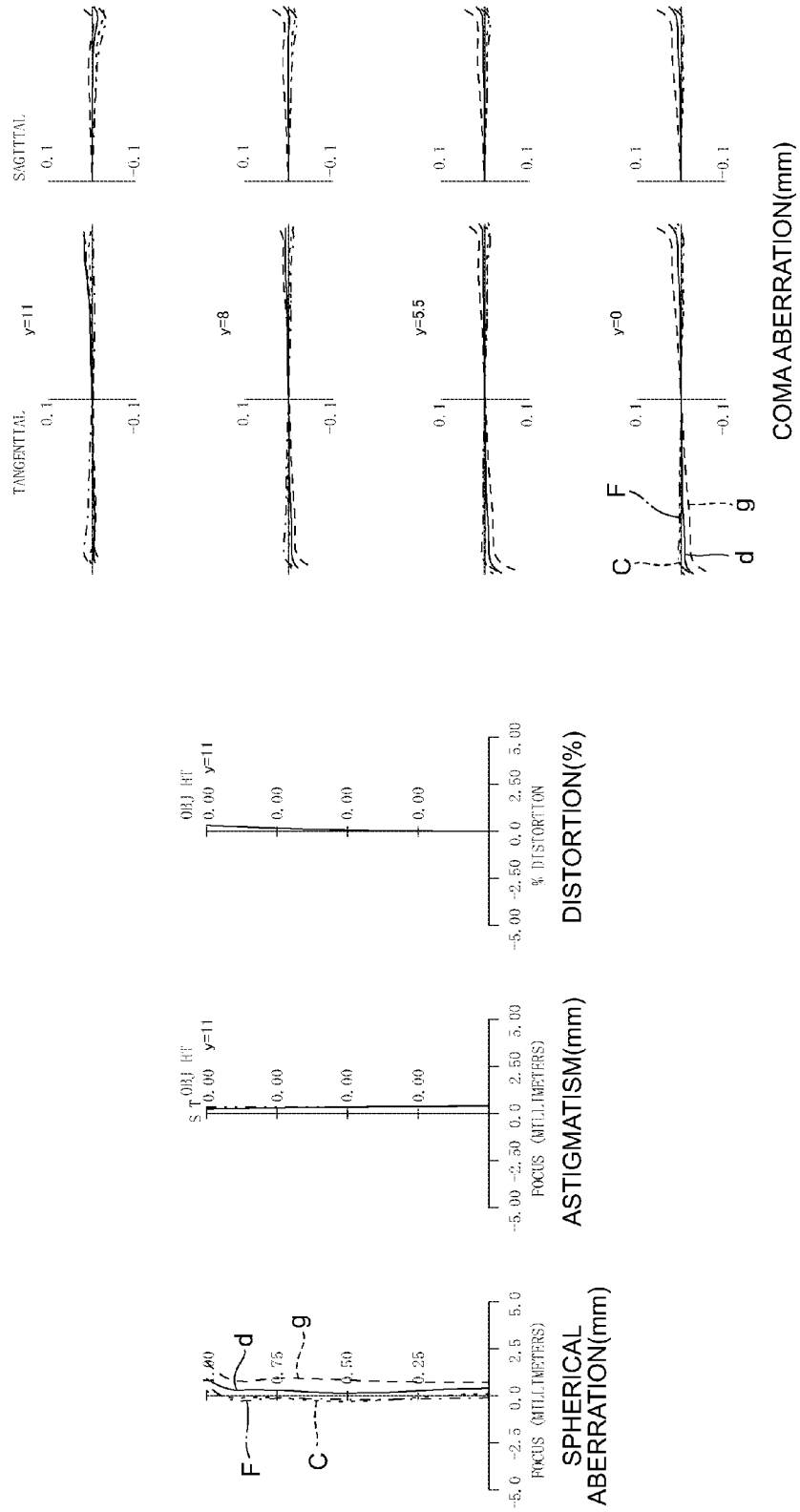

[FIG.3]
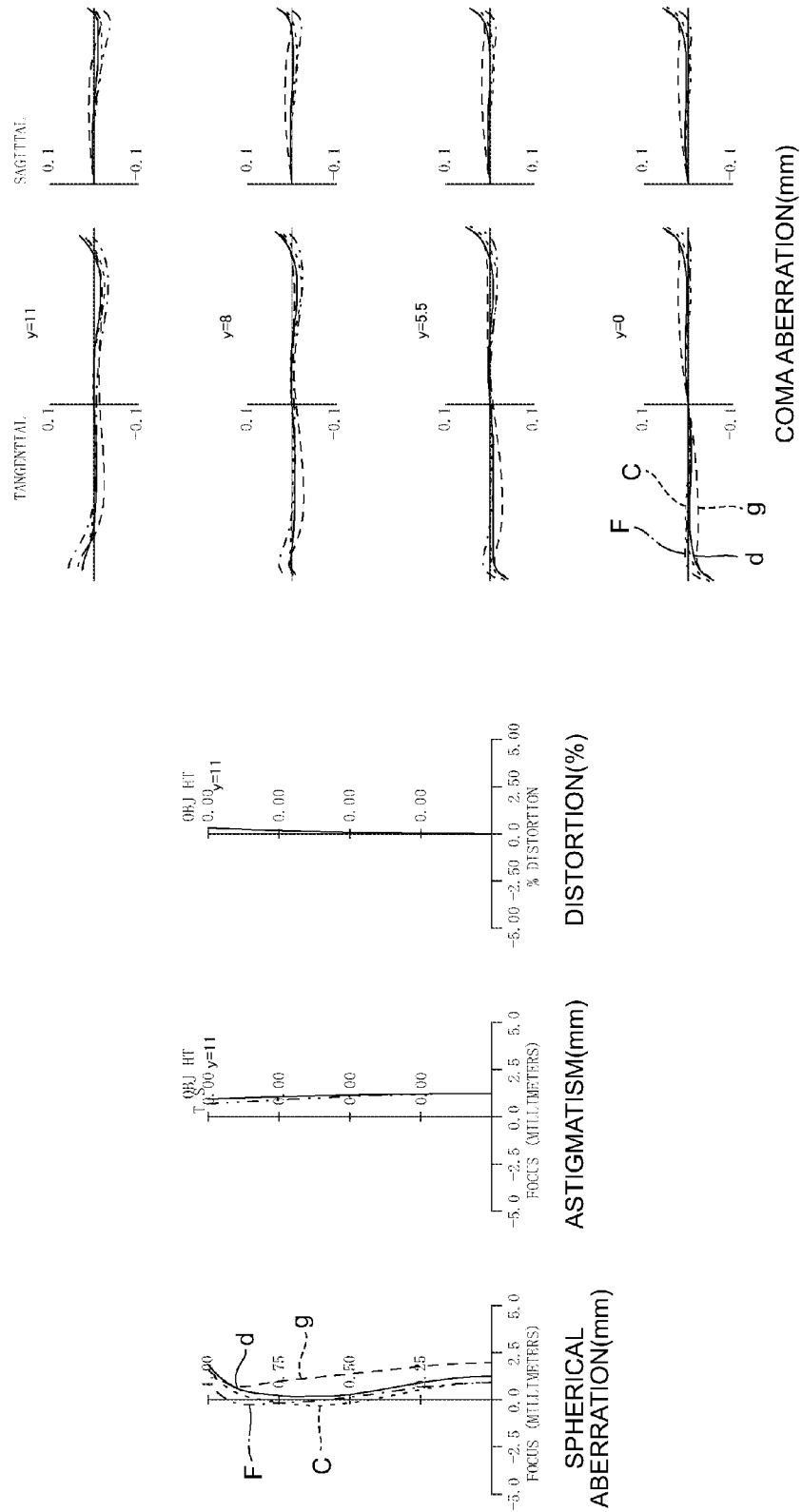

[FIG.4]
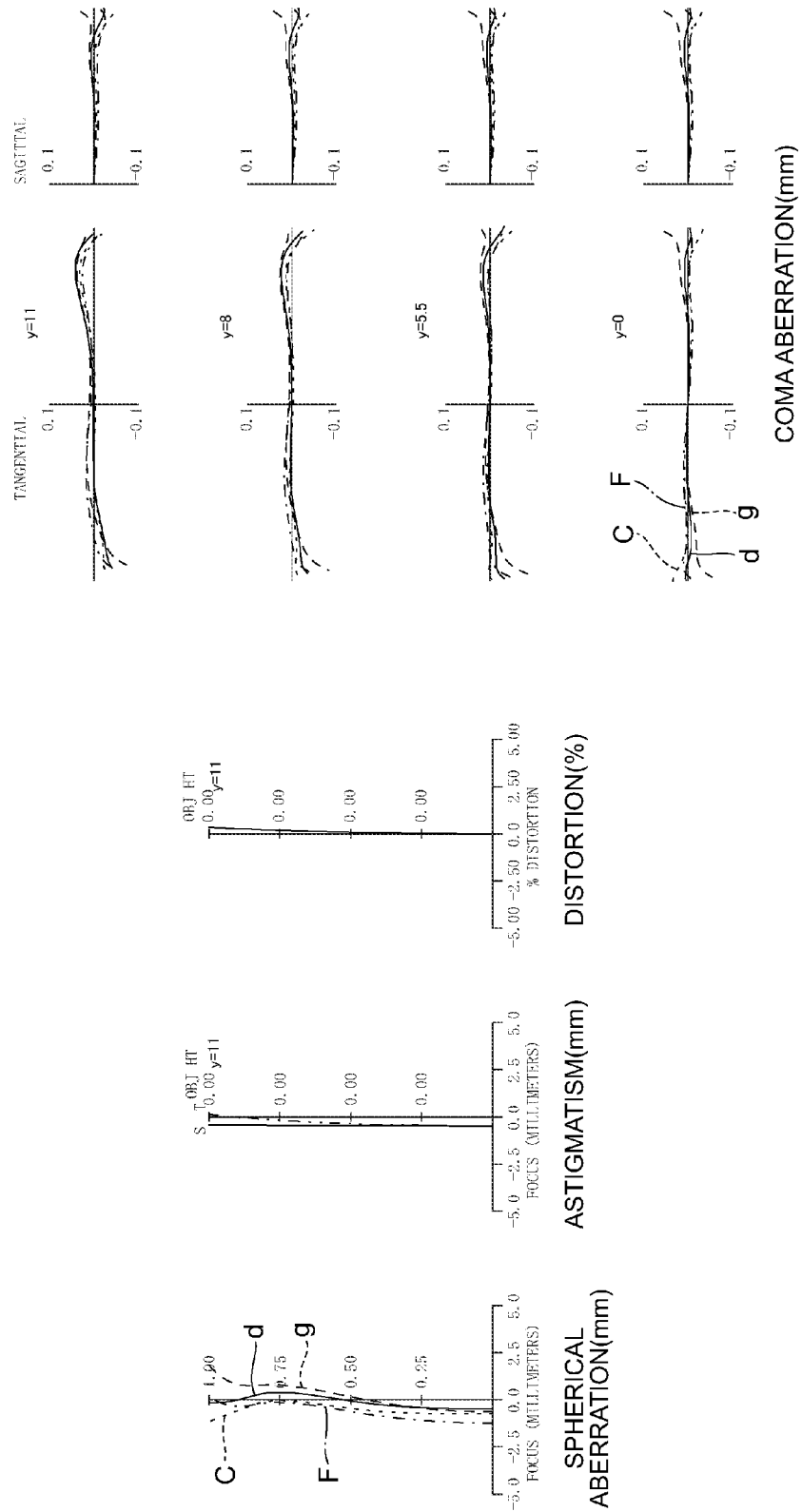

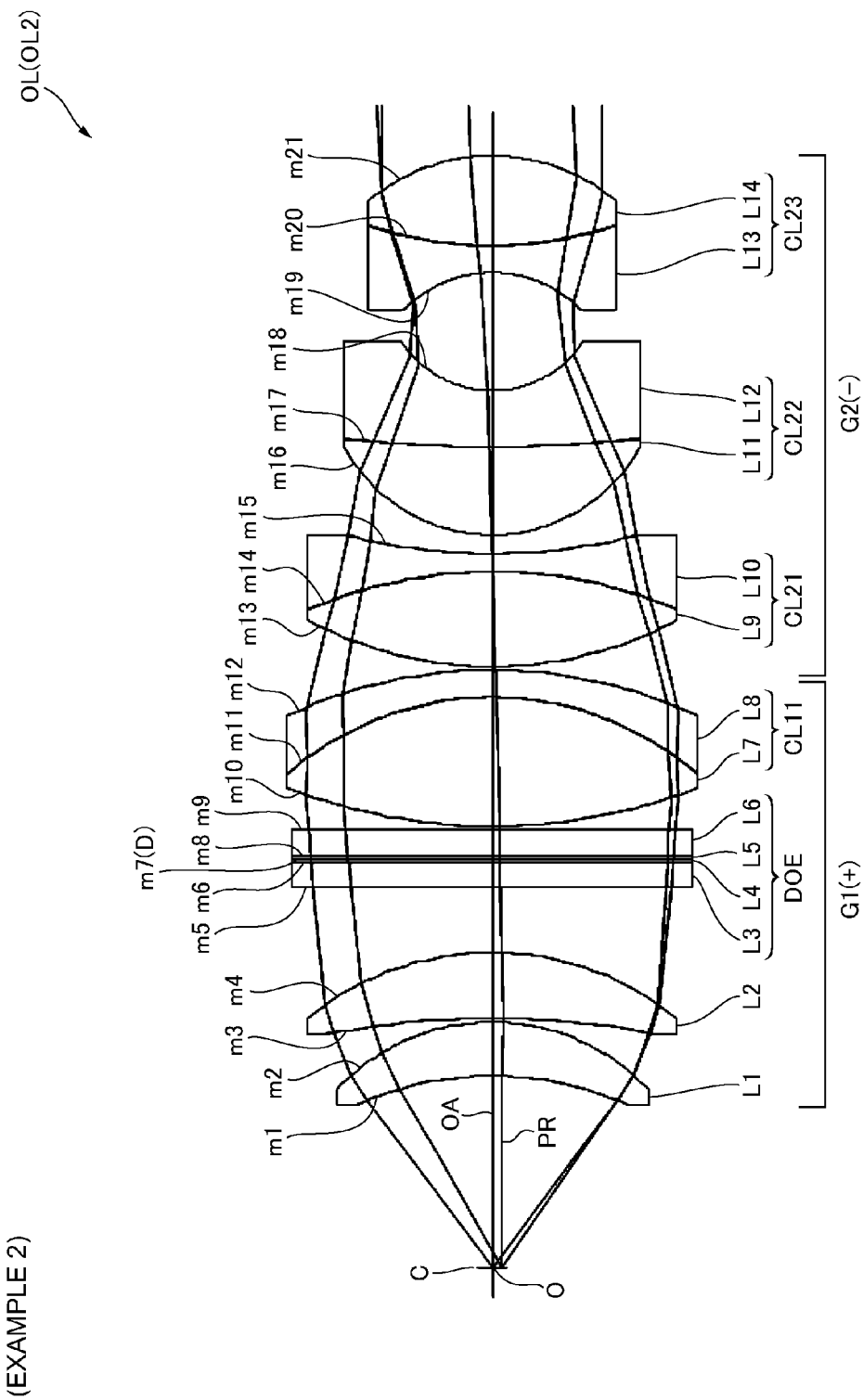
[FIG.5]

[FIG.6]
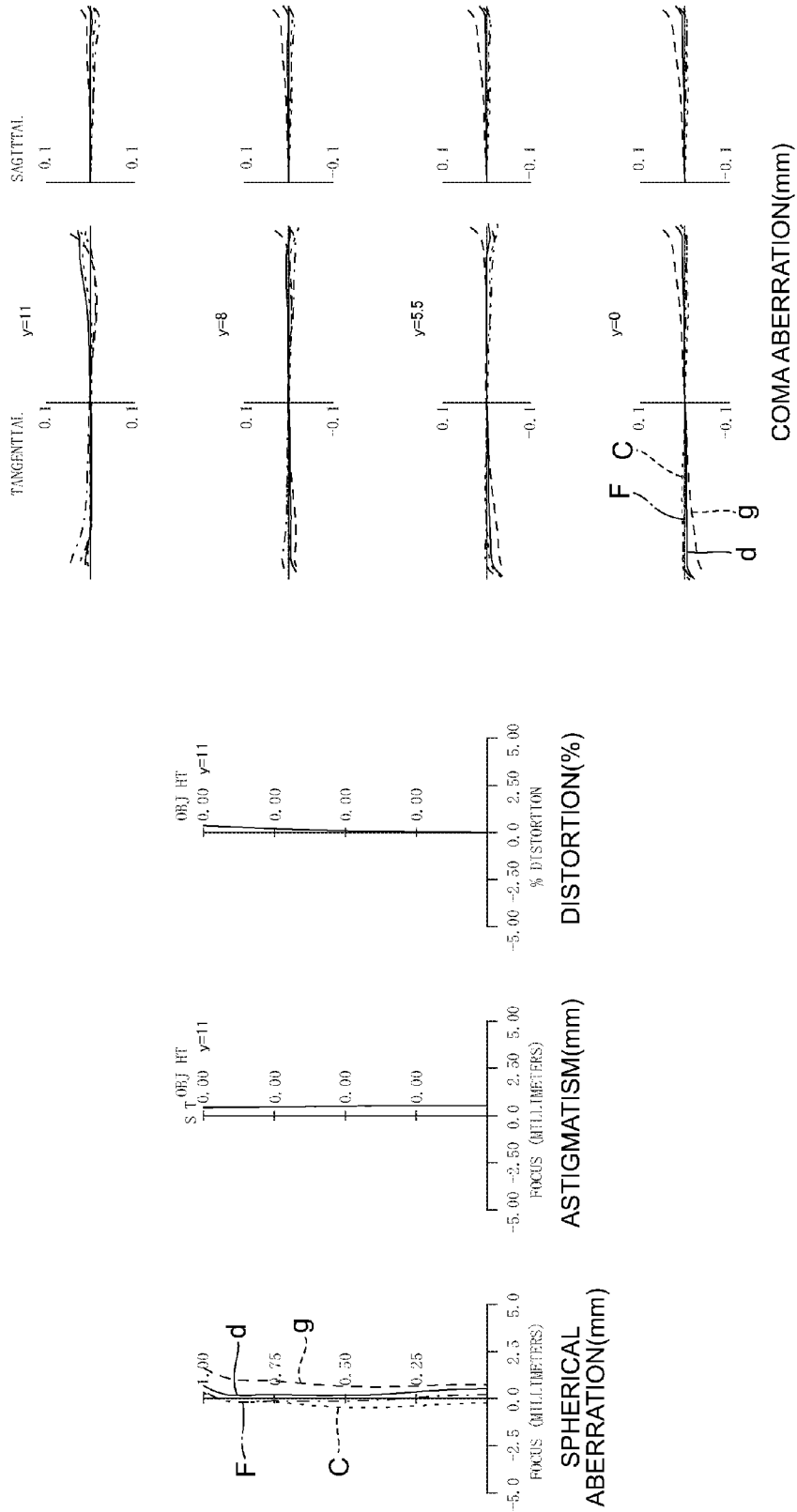

[FIG.7]
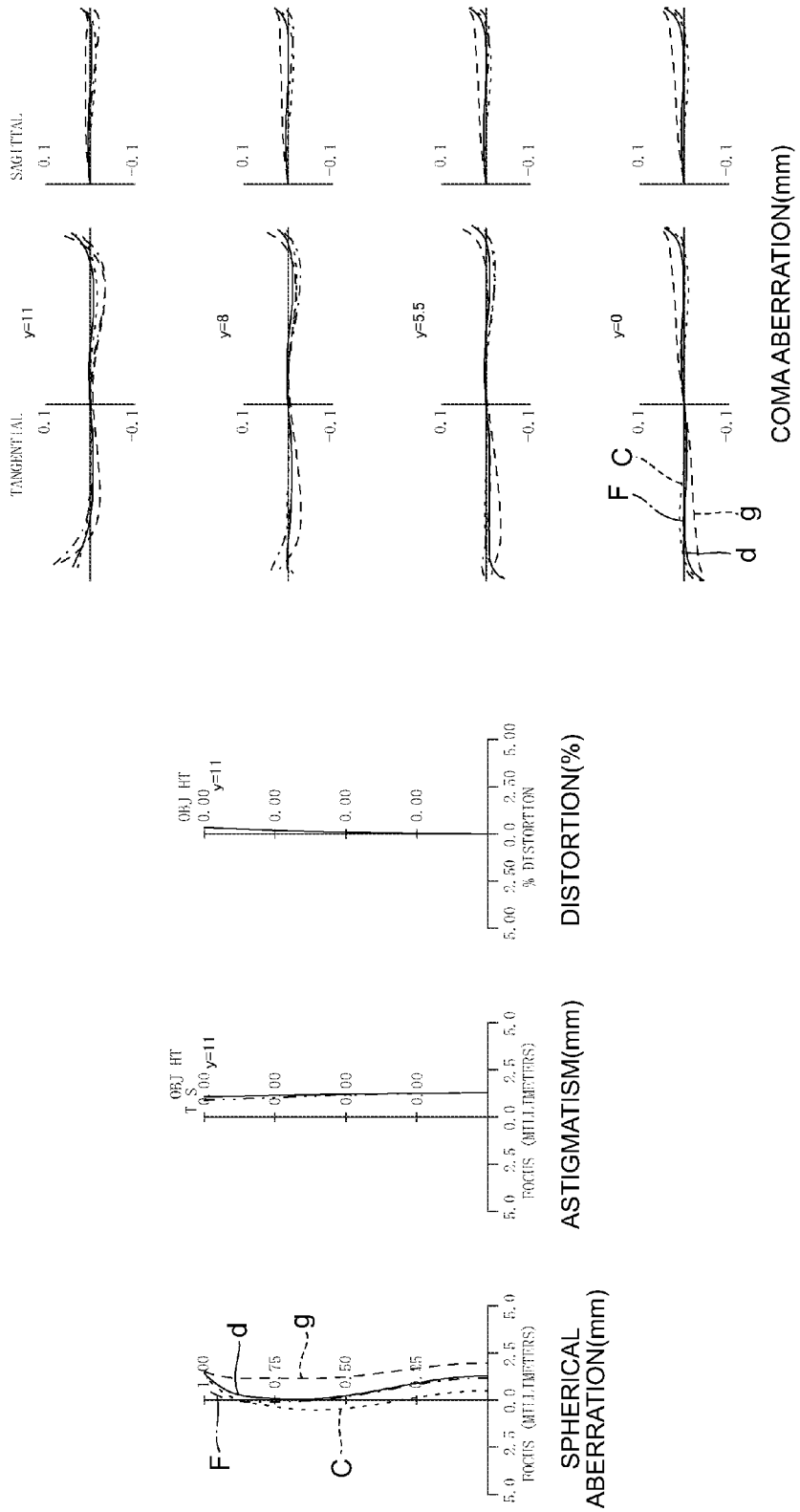

[FIG.8]
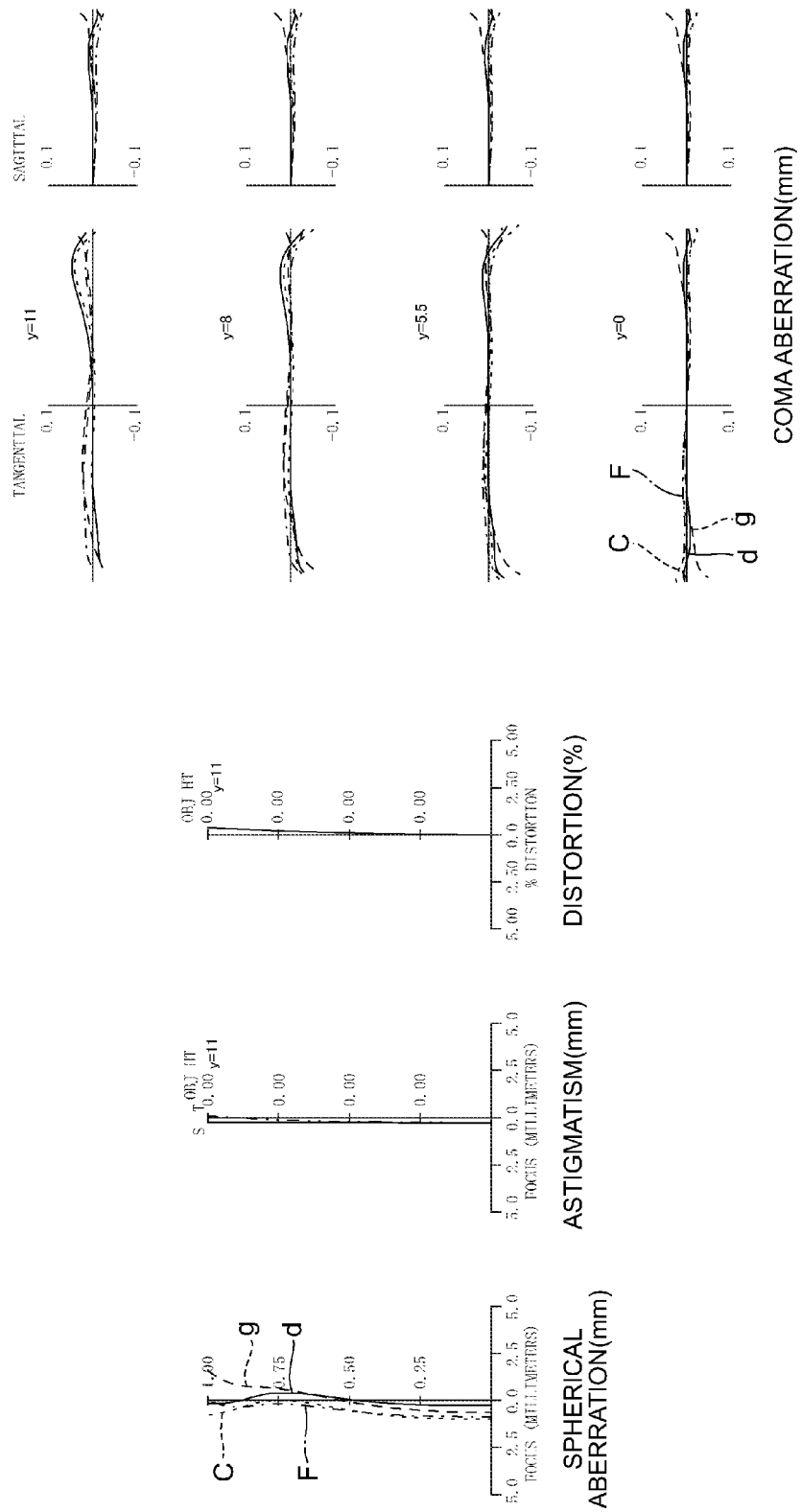

[FIG.9]
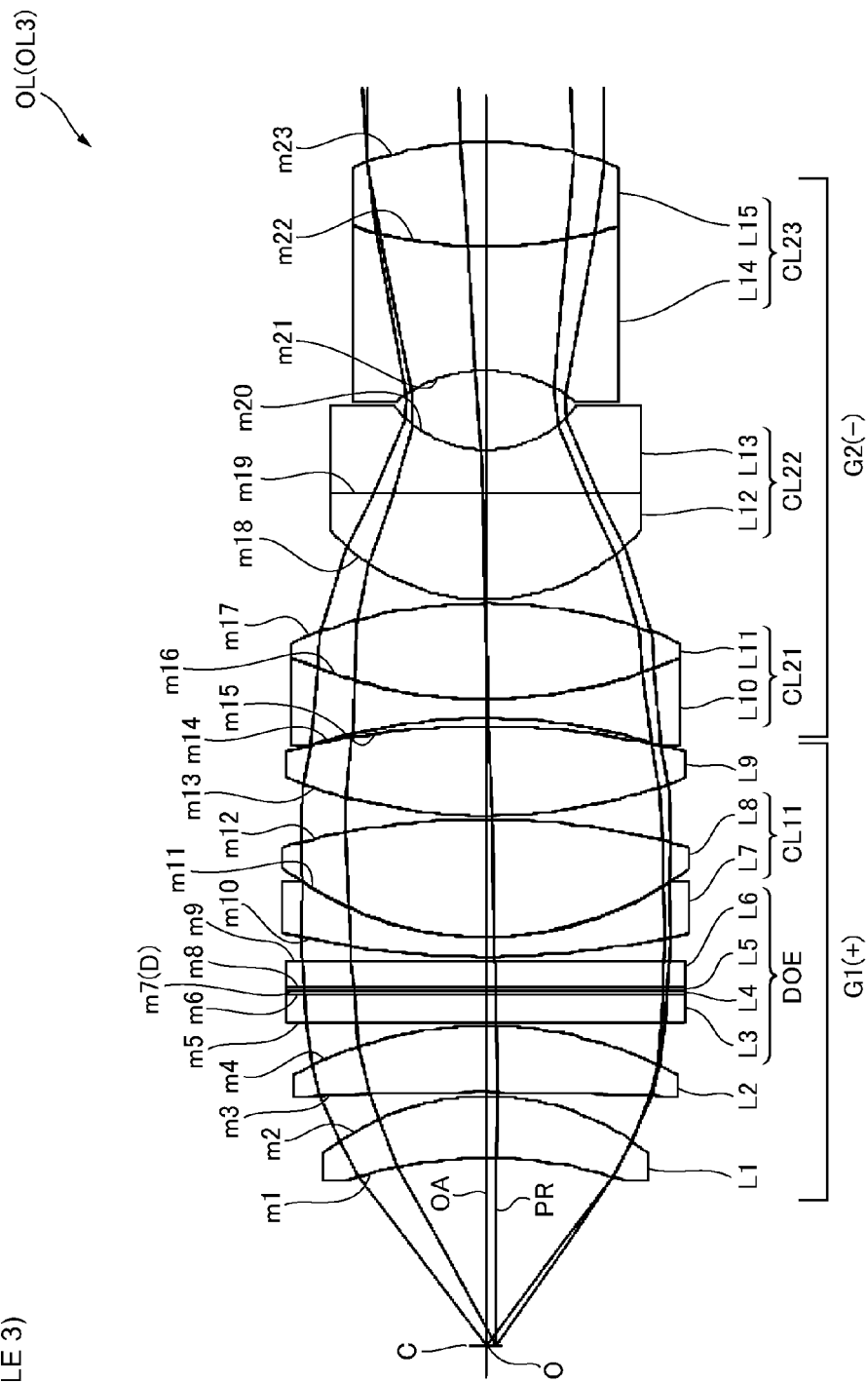

[FIG.10]
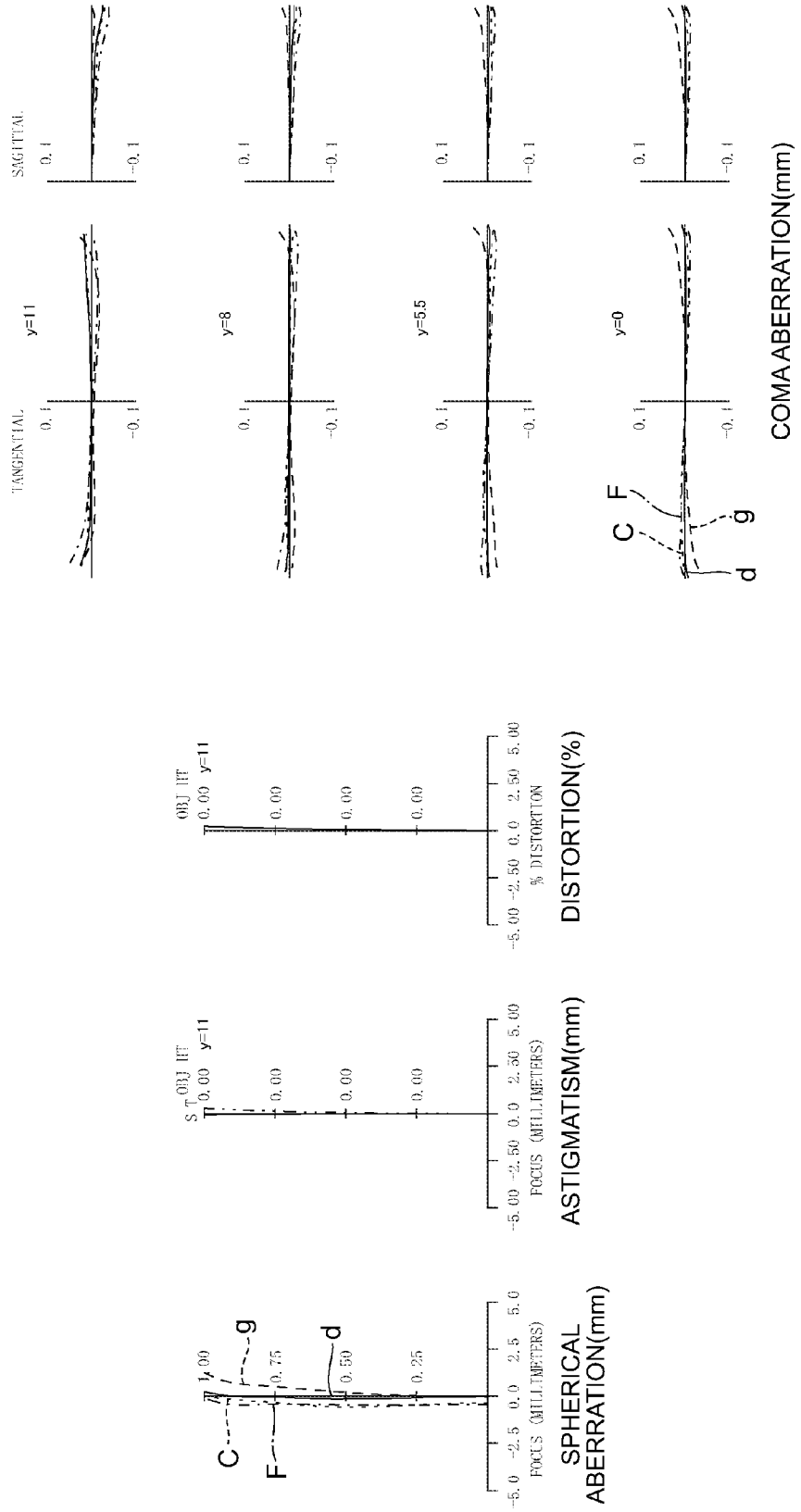

[FIG.11]
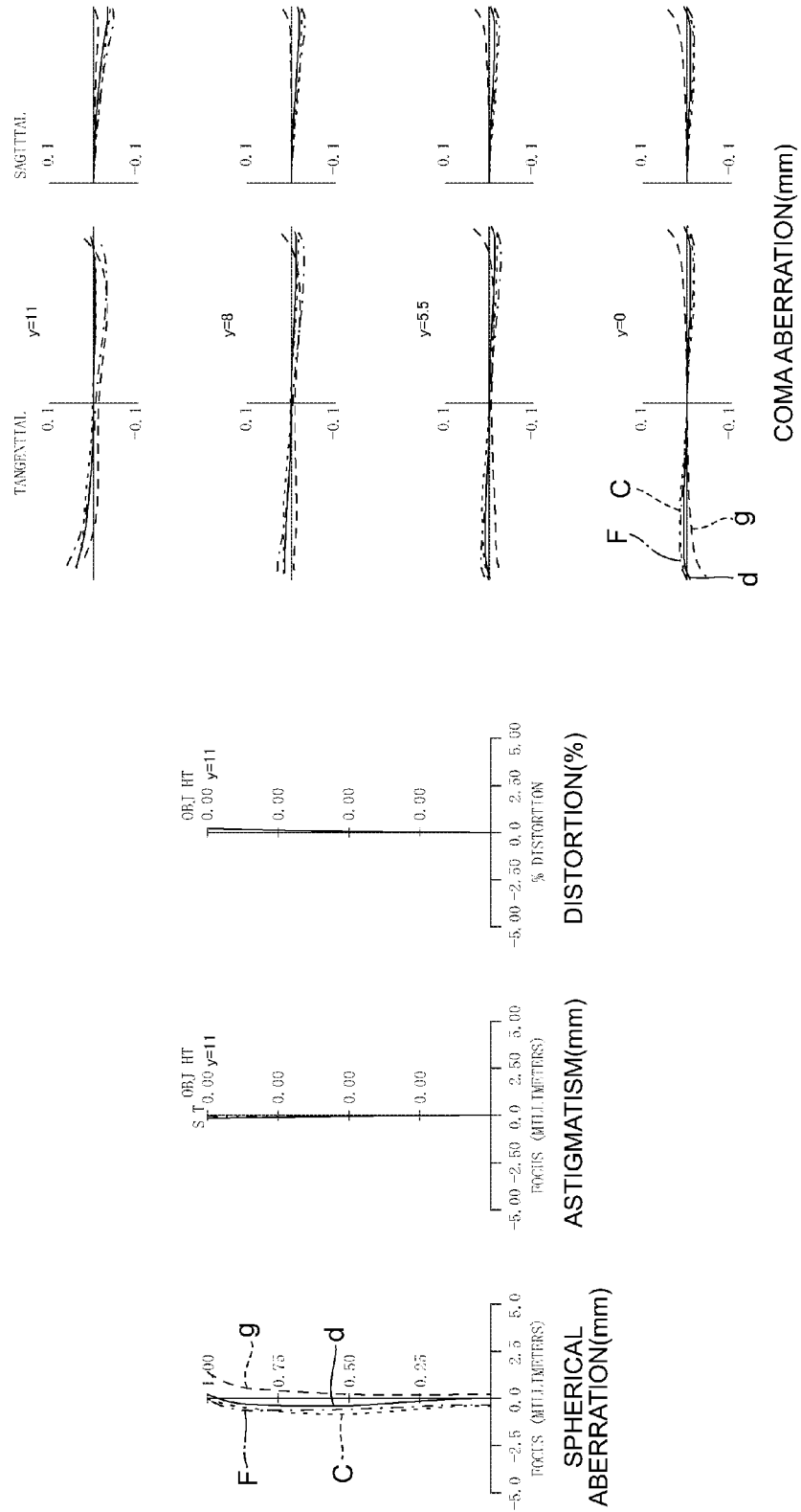

[FIG.12]
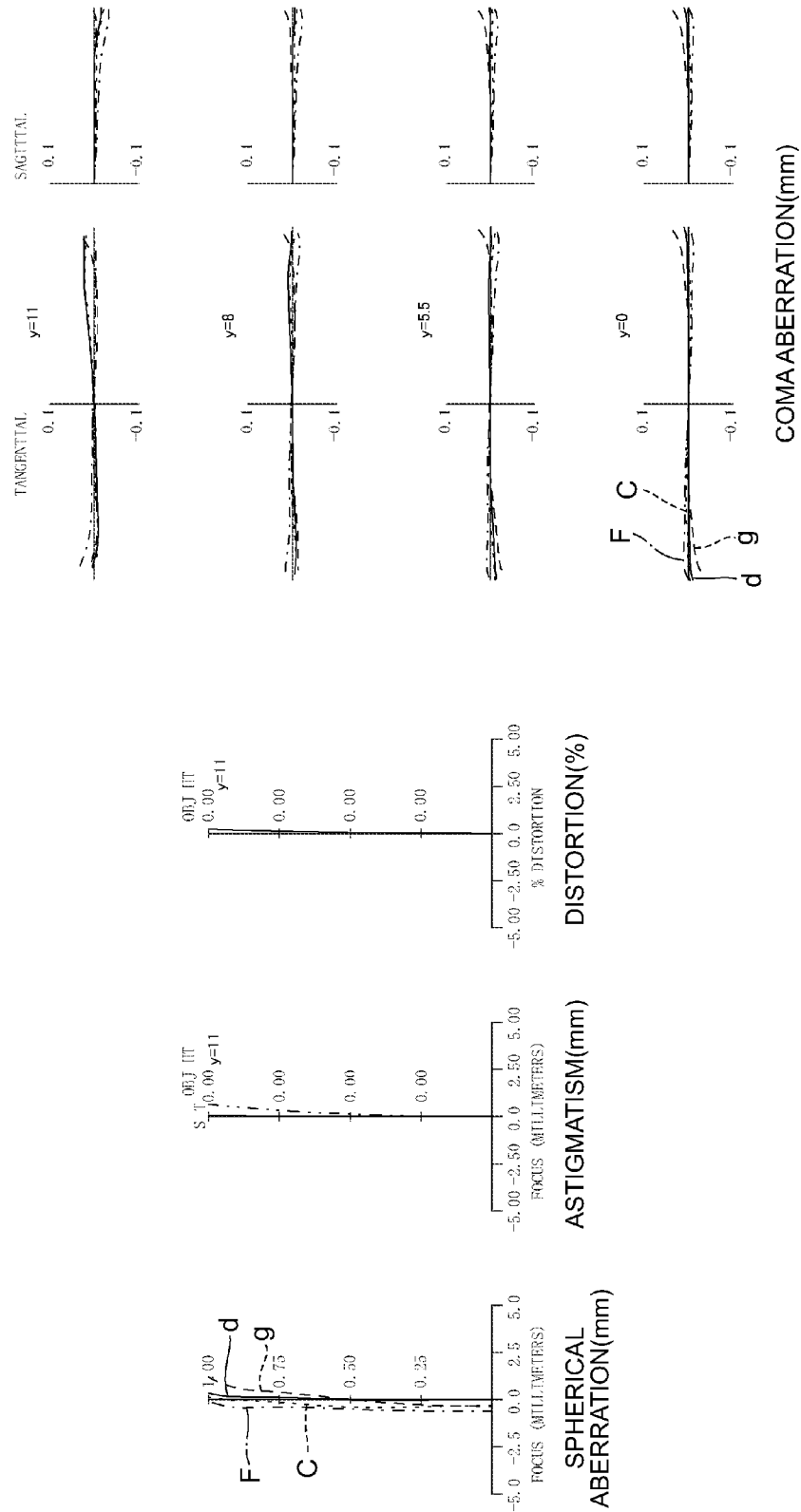

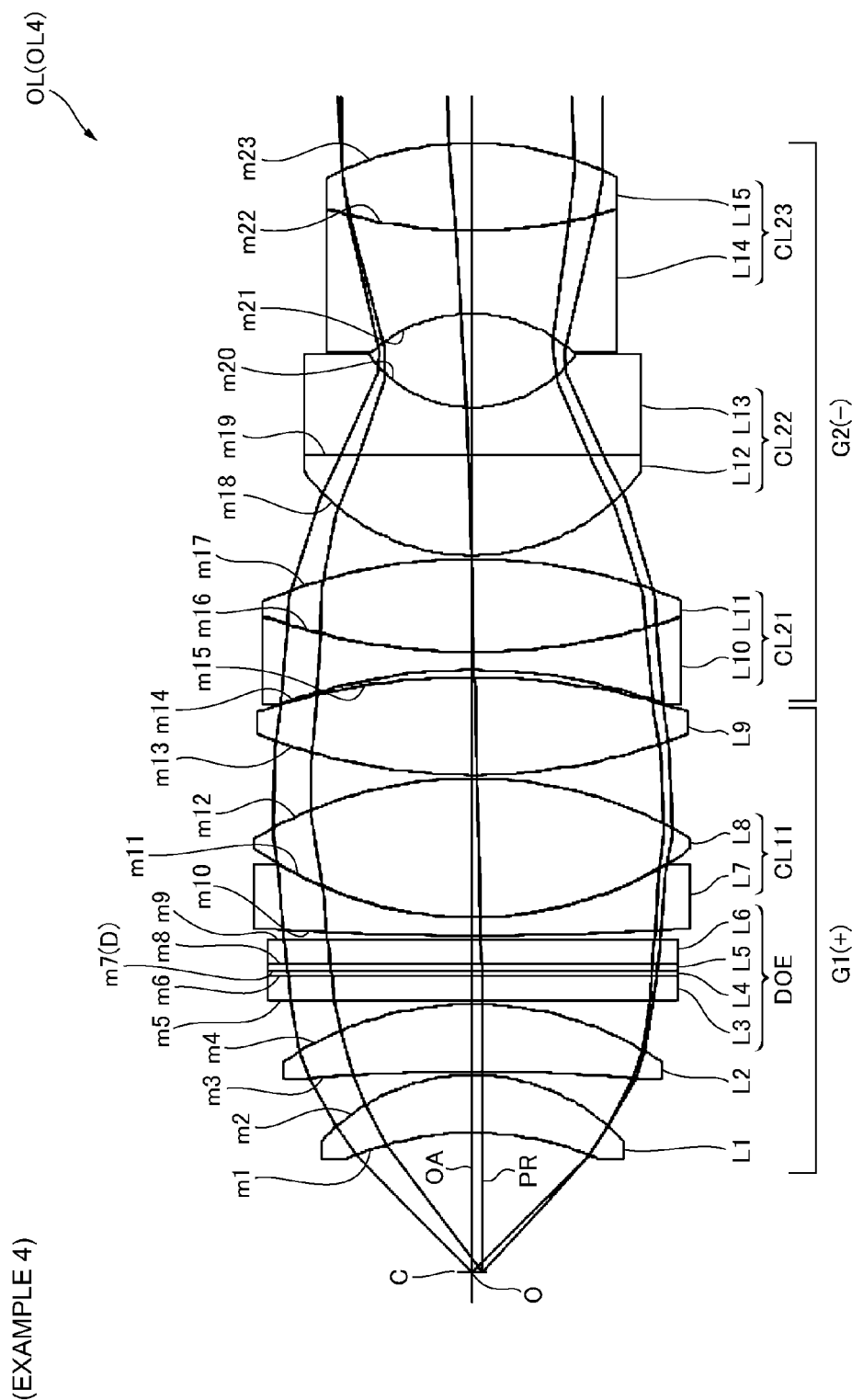
[FIG.13]
(EXAMPLE 4)

[FIG.14]
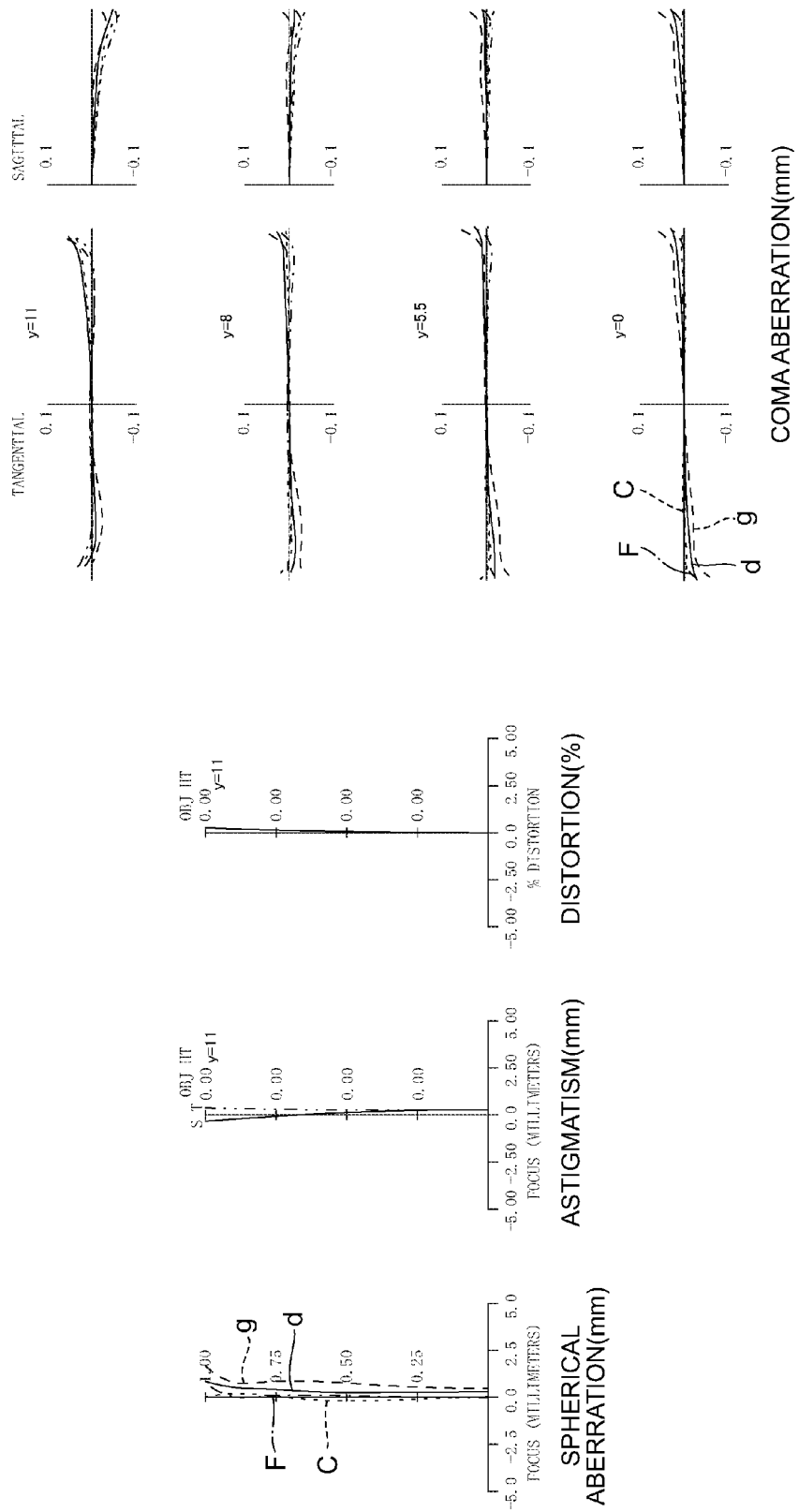

[FIG.15]
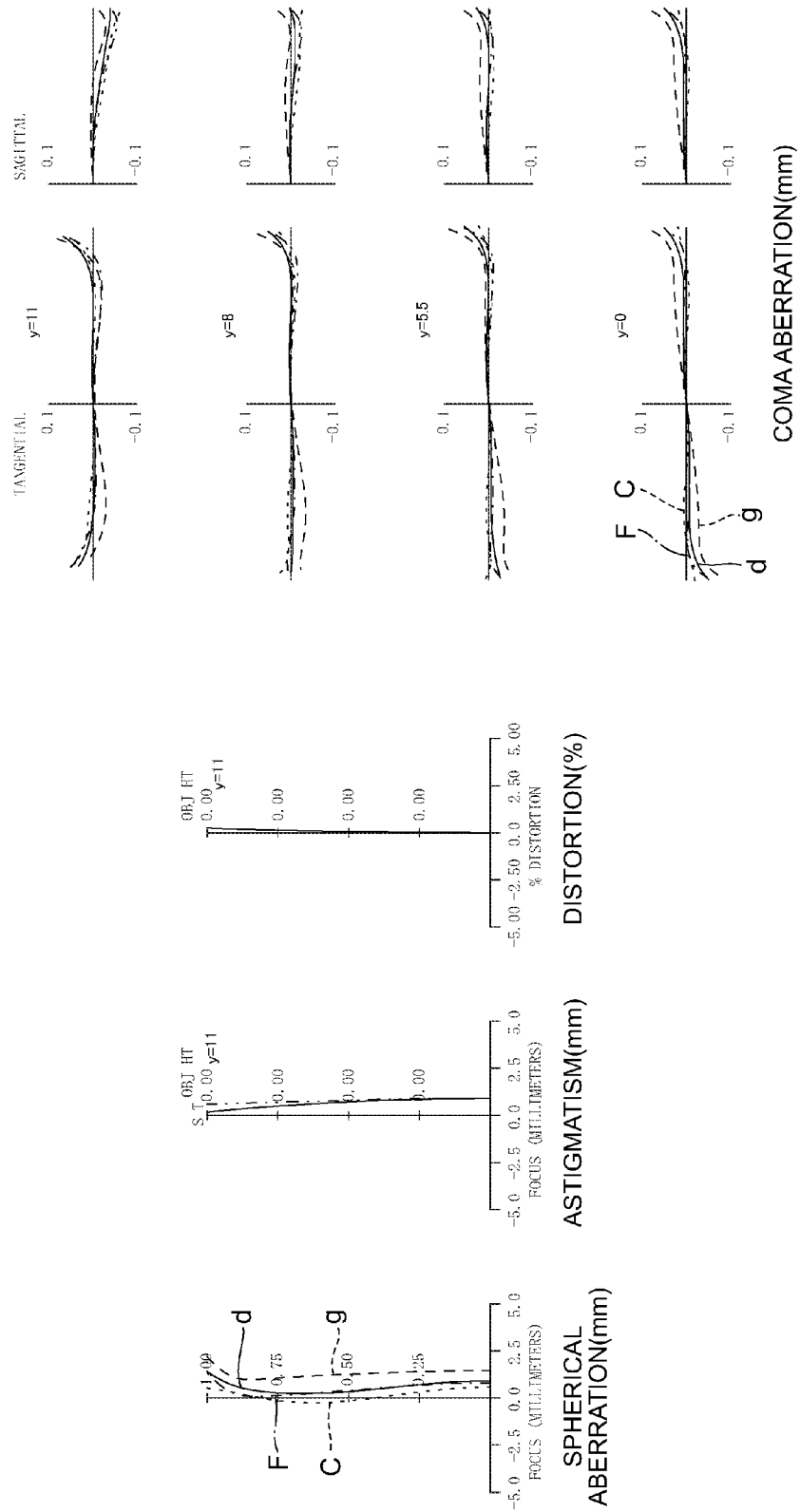

[FIG.16]
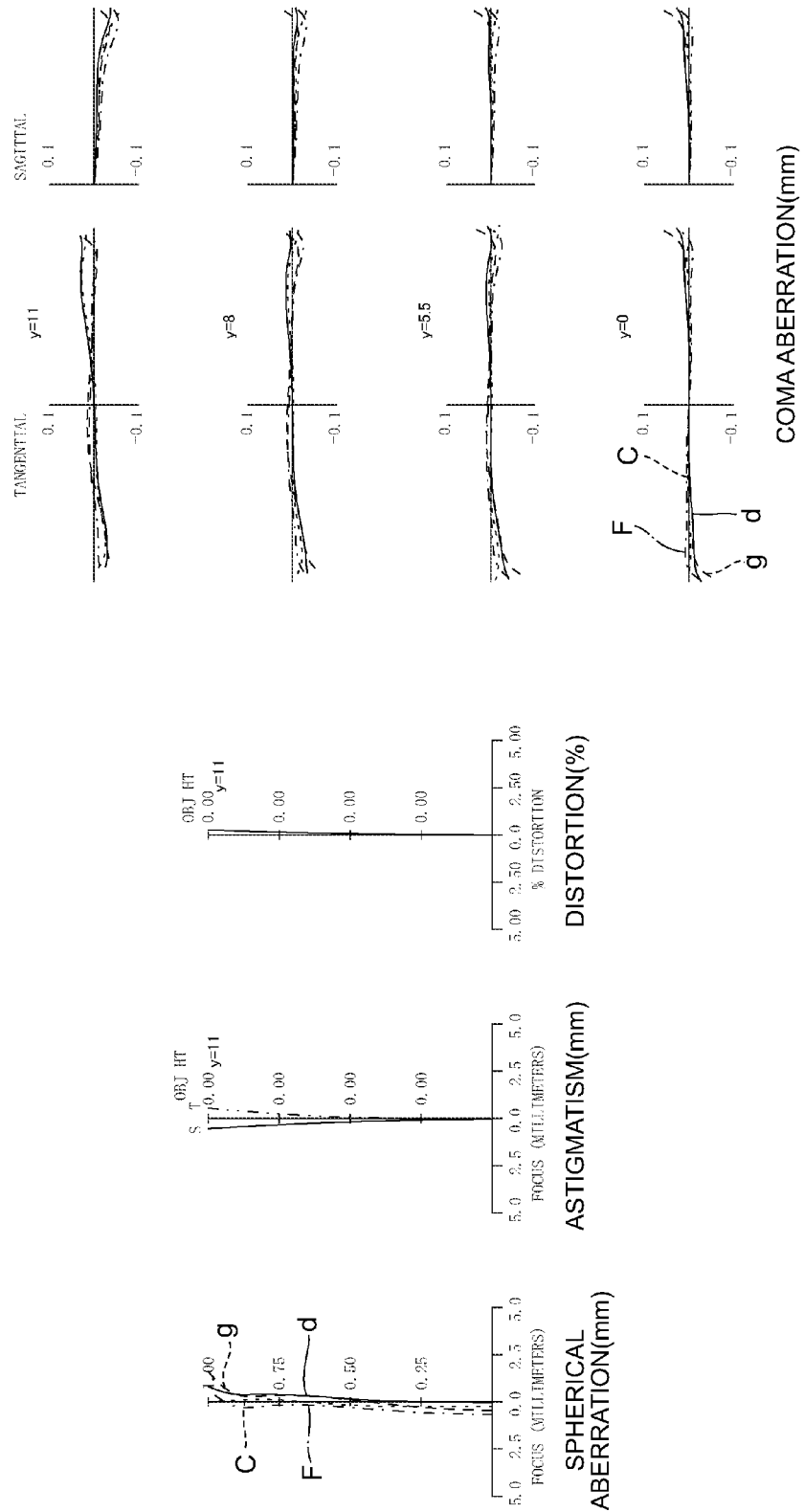

[FIG.17]
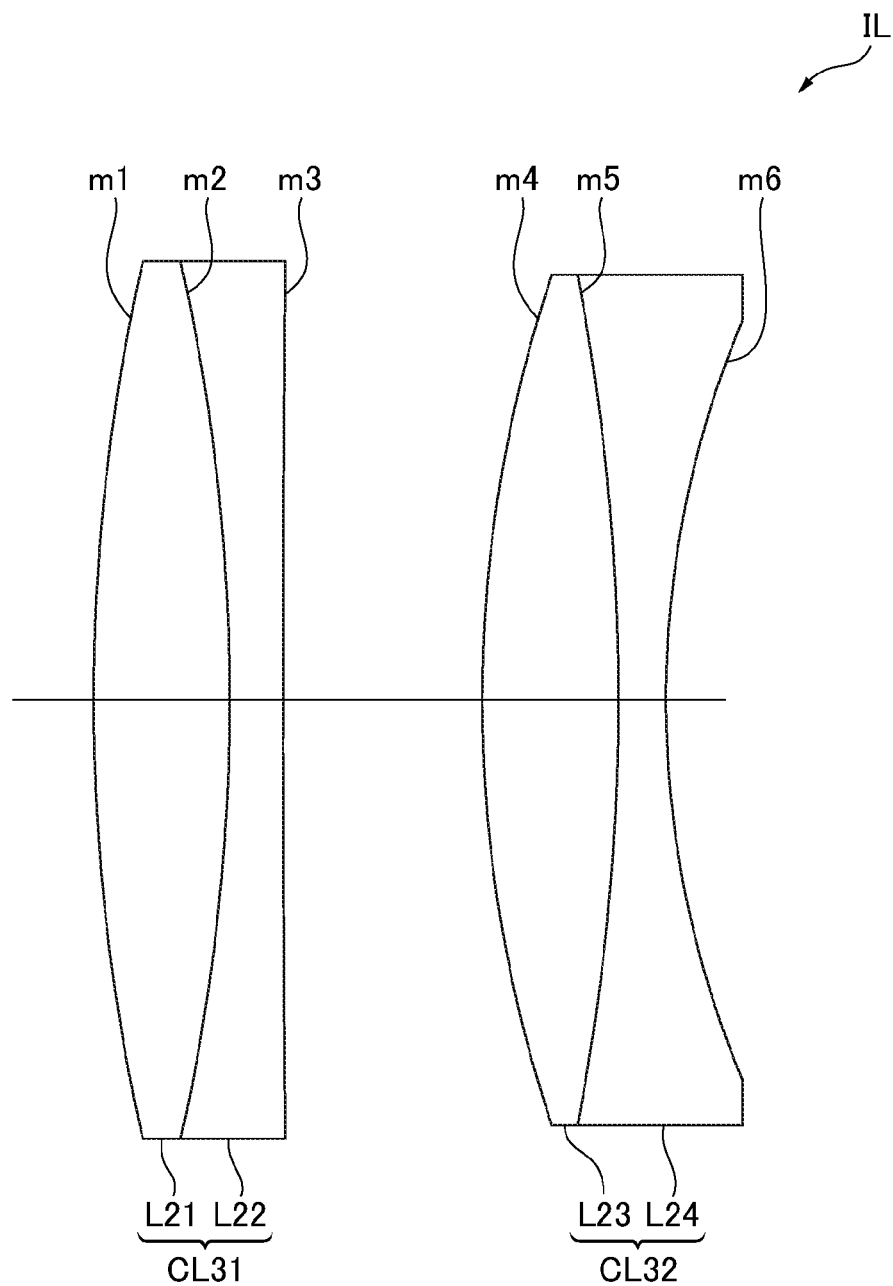

[FIG.18]
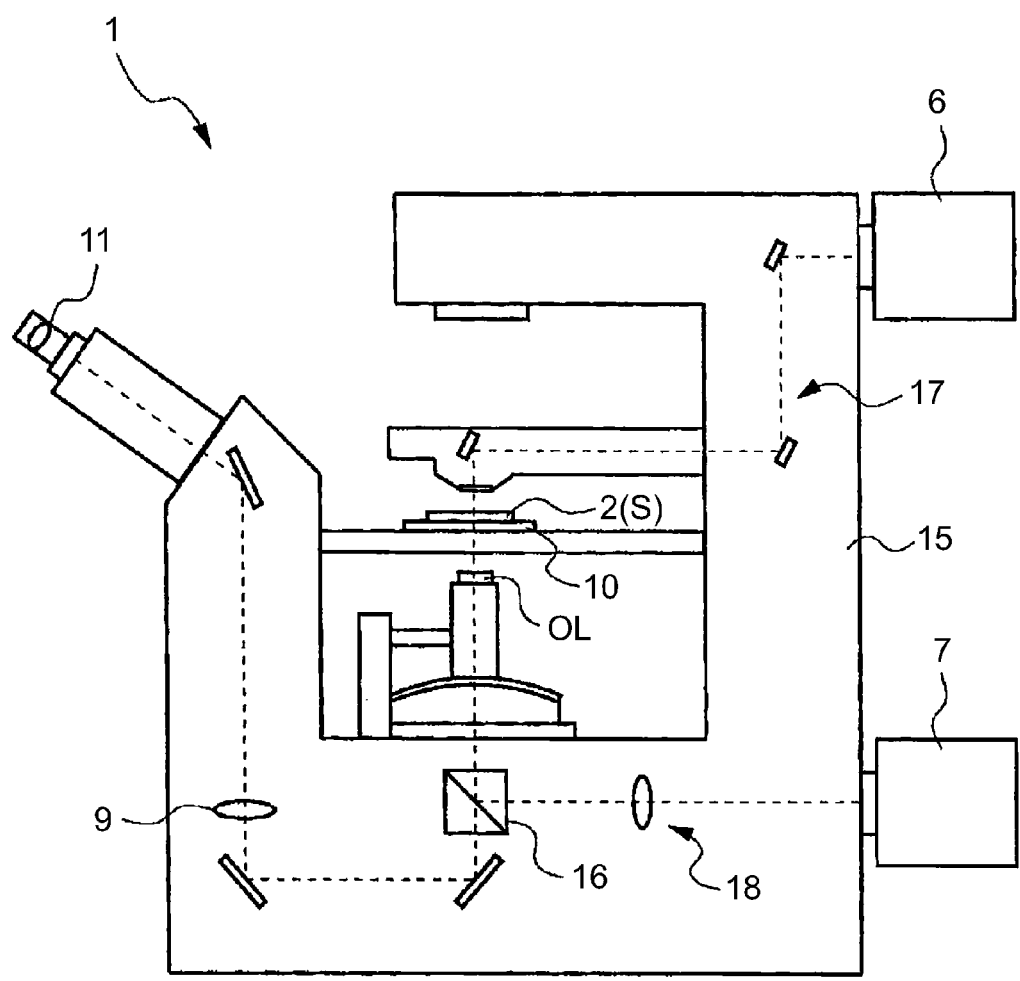

OBJECTIVE LENS AND MICROSCOPE

TECHNICAL FIELD

The present invention relates to an objective lens of a microscope, and a microscope equipped with the objective lens.

TECHNICAL BACKGROUND

In microscope observations, microscope objective lenses having a long working distance as possible are demanded in consideration of preventing physical contacts with observation objects, a work efficiency, and the like. However, in ensuring a long working distance, it becomes difficult to correct various aberrations, especially high-order spherical aberration and chromatic aberration. Therefore, a microscope objective lens using a diffractive optical element (DOE) is proposed (For instance, refer to Patent Documents 1 and 2). In such a microscope objective lens, it becomes possible to sufficiently correct chromatic aberration, thus it is possible to focus on correcting spherical aberration etc. regarding corrections by a lens.

Generally, upon observations using microscopes, the microscopes are designed in a premise of conducting observations through a light-transmitting cover glass and glass dish which is disposed over an observation object (specimen). Upon designing microscopes, lenses are designed so that aberrations are restrained, by defining thickness and refractive index of the cover glass and glass dish disposed over the observation object, within a certain range in a state using a plate with refractive index and thickness defined as above. Accordingly, in case that the thickness and refractive index, etc. of the cover glass and glass dish disposed between an object and an objective lens are greatly different from a value as a criterion when designing, this causes degradation of image-forming performance, and this degradation tendency becomes more remarkable as a numerical aperture (N. A.) becomes large.

Then, it is publicly known a microscope objective lens having a mechanism to correct aberrations by changing part of lens distances in an objective lens depending on a variation of thickness, etc. of the cover glass and glass dish disposed between the objective lens and the observation object. Moreover, generally, since the glass dish had various shapes and materials and variability of each thickness is large, objective lenses are required to have sufficient aberration correcting performance by providing a large work distance, therefore objective lenses having a mechanism performing such an aberration correction are proposed (For instance, see Patent Document 3).

PRIOR ARTS LIST

Patent Document

Patent Document 1: International Patent Publication No. WO2011/158778
Patent Document 2: International Patent Publication No. WO2012/026239
Patent Document 3: Japanese Laid-Open Patent Publication No. H10-133118 (A)

SUMMARY OF THE INVENTION

Problems to be Solved by the Invention

By the way, the objective lens disclosed in Patent Document 1 have secured a sufficient working distance, however what has a large numerical aperture has large chromatic aberration, and did not correspond to a variation of thickness of the cover glass, etc. Moreover, the objective lens disclosed in Patent Document 2 would not have a sufficient working distance, and does not correspond to a variation of thickness of the cover glass, etc. Moreover, the objective lens disclosed in Patent Document 3 is not appropriate because a working distance is not sufficient and chromatic aberration is not appropriate. As mentioned above, in the conventional objective lenses there is a problem with which there is still room for improvement.

The present invention is derived in view of such a problem, and aims to provide an objective lens of a microscope, and a microscope having the objective lens in which various aberrations such as chromatic aberration, etc. are appropriately corrected, the working distance is sufficiently long, and a variation of thickness of the cover glass, etc. can be corresponded.

Means to Solve the Problems

In order to achieve such a purpose, an objective lens according to the present invention is configured to comprise, in order from an object side, a first lens group having positive refractive power, and a second lens group having negative refractive power. The first lens group comprises, in order from the object side, a positive meniscus lens having a concave surface facing the object side, a positive lens disposed close to an image side of the positive meniscus lens, and a diffractive optical element, in which two diffractive grating elements made of mutually different optical materials are cemented each other and which has a diffractive optical surface in which diffraction grating grooves are formed on a cemented surface thereof, wherein the second lens group is composed of three cemented lenses which are configured that a positive lens and a negative lens are cemented each other, where in the following conditional expression is satisfied.

$$0.11 \leq d00/TL0 \leq 0.19$$

where d00 denotes a distance on an optical axis from the object to a surface facing the object side of the positive meniscus lens, and
TL0 denotes a distance on the optical axis from the object to a lens rear end surface of the whole objective lens.

Note that in the objective lens configured above, it is preferable that the following conditional expressions are satisfied.

$$1.7 \leq nd1$$

$$50 \leq vd1$$

where nd1 denotes refractive index to d-line of a glass material of the positive meniscus lens, and
vd1 denotes an Abbe number on the basis of d-line of the glass material of the positive meniscus lens.

In the objective lens configured above, it is preferable that the following conditional expression is satisfied.

$$224 \leq ((nd1+nd2)/2) \times |fdoe/f| \leq 280$$

where nd2 denotes refractive index to d-line of a glass material of the positive lens which configures the first lens group,
f denotes a focal length of the whole objective lens, and
fdoe denotes a focal length of the diffractive optical element.

In the objective lens configured above, it is preferable that the following conditional expression is satisfied.

$$4° \leq |\theta max| \leq 10°$$

where θmax denotes a maximum value of an angle, at which a light ray, which corresponds to a maximum numerical aperture from a center of the object, is incident on the diffractive optical element.

In the objective lens configured above, it is preferable that the following conditional expression is satisfied.

$$|nd3-nd4| \leq 0.13$$

where nd3 denotes refractive index to d-line of a glass material of one of two lenses which configures the cemented lens closest to the image in the second lens group, and nd4 denotes refractive index to d-line of a glass material of the other of the two lenses which configures the cemented lens closest to the image in the second lens group.

It is preferable that the objective lens configured above is configured to enable to correct an aberration correction by mutually moving the second lens group against the first lens group in the optical axis direction depending on thickness of a light-transmitting member disposed between the object and the first lens group.

In the objective lens configured above, it is preferable that the following conditional expression is satisfied.

$$vdmax \leq 85$$

where vdmax denotes a maximum value of the Abbe number on the basis of d-line regarding the glass material of the positive lens which configures the objective lens.

In the objective lens configured above, the second lens group is composed of, in order from the object side, a first cemented lens configured with a positive lens and a negative lens cemented each other, a second cemented lens in which a positive lens having a convex surface facing the object side is cemented with a negative lens having a concave surface facing the image side, a third cemented lens in which a negative lens having a concave surface facing the object side is cemented with a positive lens having a convex surface facing the image side.

In the objective lens configured above, it is preferable that the diffractive optical element is disposed closer to the object than a location in which a primary ray crosses with the optical axis.

In the objective lens configured above, it is preferable that the diffractive optical element is disposed closer to the object than a location in which a diameter of a flux of light passing through the first lens group becomes largest.

The microscope according to the present invention is equipped with the objective lens configured above.

Advantageous Effects of the Invention

According to the present invention, it is possible to provide an objective lens of a microscope in which various aberrations such as chromatic aberration, etc. are appropriately corrected, the working distance is sufficiently long, and a variation of thickness of the cover glass, etc. can be corresponded.

BRIEF DESCRIPTION OF THE DRAWINGS

FIG. 1 illustrates a configuration diagram of a microscope objective lens according to Example 1.

FIG. 2 illustrates a graph showing various aberrations (spherical aberration, astigmatism, distortion, and coma aberration) in case that thickness of a light-transmitting parallel plain plate is 1.0 mm in the microscope objective lens according to Example 1.

FIG. 3 illustrates a graph showing various aberrations in case that the thickness of the light-transmitting parallel plain plate is 0.0 mm in the microscope objective lens according to Example 1.

FIG. 4 illustrates a graph showing various aberrations in case that the thickness of the light-transmitting parallel plain plate is 2.0 mm in the microscope objective lens according to Example 1.

FIG. 5 illustrates a configuration diagram of a microscope objective lens according to Example 2.

FIG. 6 illustrates a graph showing various aberrations (spherical aberration, astigmatism, distortion, and coma aberration) in case the thickness of the light-transmitting parallel plain plate is 1.0 mm in the microscope objective lens according to Example 2.

FIG. 7 illustrates a graph showing various aberrations in case that the thickness of the light-transmitting parallel plain plate is 0.0 mm in the microscope objective lens according to Example 2.

FIG. 8 illustrates a graph showing various aberrations in case that the thickness of the light-transmitting parallel plain plate is 2.0 mm in the microscope objective lens according to Example 2.

FIG. 9 illustrates a configuration diagram of a microscope objective lens according to Example 3.

FIG. 10 illustrates a graph showing various aberrations (spherical aberration, astigmatism, distortion, and coma aberration) in case the thickness of the light-transmitting parallel plain plate is 1.0 mm in the microscope objective lens according to Example 3.

FIG. 11 illustrates a graph showing various aberrations in case that the thickness of the light-transmitting parallel plain plate is 0.0 mm in the microscope objective lens according to Example 3.

FIG. 12 illustrates a graph showing various aberrations in case that the thickness of the light-transmitting parallel plain plate is 2.0 mm in the microscope objective lens according to Example 3.

FIG. 13 illustrates a configuration diagram of a microscope objective lens according to Example 4.

FIG. 14 illustrates a graph showing various aberrations (spherical aberration, astigmatism, distortion, and coma aberration) in case of the thickness of the light-transmitting parallel plain plate is 1.0 mm in the microscope objective lens according to Example 4.

FIG. 15 illustrates a graph showing various aberrations in case that the thickness of the light-transmitting parallel plain plate is 0.0 mm in the microscope objective lens according to Example 4.

FIG. 16 illustrates a graph showing various aberrations in case that the thickness of the light-transmitting parallel plain plate is 2.0 mm in the microscope objective lens according to Example 4.

FIG. 17 illustrates a lens configuration diagram of an imaging lens used with the microscope objective lens.

FIG. 18 illustrates a configuration diagram showing an example of a microscope equipped with the microscope objective lens.

DESCRIPTION OF THE EMBODIMENTS

The embodiments of the present invention are now described with reference to drawings. Firstly, configurations of the microscope objective lens according to the present embodiment is explained using FIG. 1. This microscope objective lens OL comprises, in order from an object O (a light-transmitting parallel plain plate C (a cover glass or glass dish)), a first lens group G1 having positive refractive power, and a second lens group G2 having negative refractive power.

The first lens group G1 is a lens group for converging a diverging flux of light which exits from the object O and making it a converging flux of light, and is configured to comprise one positive meniscus lens L1 having a concave surface facing the object O, and one positive lens L2 (corresponding to the positive meniscus lens L2 in FIG. 1) disposed closer to the image.

In the first lens group G1, a diffractive optical surface is formed on any surface of optical members which configure the first lens group G1 in order to correct chromatic aberration. For instance, in the microscope objective lens OL shown in FIG. 1, the first lens group G1 is configured to comprise a diffractive optical element which is configured to cement, in order as follows, an optical glass L3, a diffractive optical element DOE (so called "Tight Bonded Multi-Layer Diffractive Optical Element") in which two optical members L4 and L5 which are made from mutually different resin materials are cemented each other and which has a diffractive optical surface D in which diffractive grating grooves are formed on a cemented surface thereof, and an optical glass L6.

This diffractive optical element DOE enables to improve a diffraction efficiency within a broad wavelength range containing a range from g-line to C-line. Therefore, the microscope objective lens OL according to the present embodiment can be used within a broad wavelength range. Note that the diffraction efficiency means, when using 1st order diffracted light in the light-transmitting diffractive optical element, a rate η(=I1/I0×100[%]) regarding incident intensity I0 and strength I1 of the 1st order diffracted light. Note that an advantageous effect in which the diffractive optical members L4 and L5 is made from resin is to be able to form the diffractive optical surface D by molding and curing using ultraviolet, more easily than using ordinary optical glasses.

The diffractive optical element DOE (diffractive optical surface D) is arranged at a location closer to the object O than a location at which the primary ray PR crosses with the optical axis OA. Note that in FIG. 1 the diffractive optical element DOE is further disposed a location closer to the object O than a part to which a diameter of a flux of light passing through the first lens group G1 becomes largest.

In the first lens group G1, when chromatic aberration is corrected only with the diffractive optical element DOE, a minimum pitch of the diffraction grating grooves of the diffractive optical surface D will excessively become small, thus it becomes difficult to manufacture the diffractive optical element DOE. Therefore, the first lens group G1 is configured to have at least a cemented lens CL11 so as to individually share corrections of chromatic aberration. At least one of this cemented lens CL11 is disposed closer to the image than a location of the diffractive optical element DOE (diffractive optical surface D). Note that in FIG. 1 the first lens group G1 is configured to comprise a cemented lens CL11 disposed closer to the image than a location of the diffractive optical element DOE.

The diffractive optical surface D is formed so that several to hundreds of minute groove or slit lattice structures are formed concentrically, and has a characteristic to diffract light incident on the diffractive optical surface D in a direction defined by lattice pitches (each distance between the neighboring diffraction grating grooves) and a wavelength of the incident light. Regarding a characteristic of refractive power due to a wavelength difference of ordinary refractive lens, as wavelength becomes shorter variate becomes larger, while the diffractive optical element DOE including such the diffractive optical surface D has a characteristic in which a property of refractive power linearly changes against the wavelength. Then, it becomes possible to appropriately correct chromatic aberration due to obtaining an achromatism advantageous effect, by combining what refractive power variate due to wavelength is linearized to by combining the plurality of reflective lenses, and the diffractive optical element DOE.

The second lens group G2 is a lens group which configures parallel light by converging light by the first lens group G1. This second lens group G2 has negative refractive power as a whole, and is composed of three cemented lens CL21, CL22 and CL23 (a first cemented lens CL21, a second cemented lens CL22, and a third cemented lens CL23) composed of a positive lens and a negative lens. The two cemented lens CL22 and CL23 disposed closer to the image among these three cemented lenses correct Petzval sum, thus these have so called a Gaussian configuration. That is, the second lens group G2 comprises a second cemented lens CL22 in which a positive lens L11 having a convex surface facing the object O is cemented with a negative lens L12 (corresponding to a biconcave lens L12 in FIG. 1) having a strongly-curved concave surface facing the image side, and a third cemented lens CL23 in which a negative lens L13 (corresponding to a biconcave lens L13 in FIG. 1) having a strongly-curved concave surface facing the object O is cemented with a positive lens L14 having a convex surface facing the image side, wherein the second lens group G2 is configured so that the concave surface (corresponding to the 18th surface) of the negative lens L12 confronts the concave surface (corresponding to the 19th surface) of the negative lens L13. With this arrangement, it is possible to obtain appropriately-balanced corrections between axial chromatic aberration and lateral chromatic aberration while reducing Petzval sum.

Next, conditions for configuring the microscope objective lens OL according to the present embodiment are described below. Firstly, since the positive meniscus lens L1 disposed closest to the object O is a positive meniscus single lens having a concave surface facing the object O so as to restrain generated aspherical aberration and coma aberration as small as possible. Furthermore, the positive meniscus lens L1 has a function to keep an image surface plain by reducing Petzval sum, and in addition, in order not to generate chromatic aberration as possible it is preferable that the following conditional expressions (1) and (2) are satisfied.

$$1.7 \leq nd1 \quad (1)$$

$$50 \leq vd1 \quad (2)$$

where $nd1$ denotes refractive index to d-line (wavelength $\lambda=587.6$ nm) of the glass material of the positive meniscus lens L1, and $vd1$ denotes an Abbe number on the basis of d-line of the glass material of the positive meniscus lens L1.

In case of satisfying the conditional expression (1), a lens surface of the positive meniscus lens L1 is loosely curved, thus each aberration can be appropriately maintained. In case of deceeding a lower limit of the conditional expression (1), Petzval sum will become large, thus flatness of the image surface cannot be maintained, it is not preferable. Note that by setting the lower limit of the conditional expression (1) to 1.72, this enables to further have the advantageous effect of the present application.

In case of satisfying the conditional expression (2), it is possible to restrain generation of chromatic aberration. In case of deceeding the lower limit of the conditional expression (2), chromatic aberration, especially second-order dispersion is greatly generated, it is not preferable. Note that by setting the lower limit of the conditional expression (2) to 54, this enables to further have the advantageous effect of the present application.

The microscope objective lens OL is configured so that the following conditional expression (3) is satisfied.

$$0.11 \leq d00/TL0 \leq 0.19 \quad (3)$$

where d00 denotes a distance on the optical axis from the object O (a focal point surface facing the object side of the microscope objective lens OL) to a lens surface (a surface (the 1st surface in FIG. 1) facing the object O of the positive meniscus lens L1) closest to the object O of the first lens group G1, in case that thickness of the light-transmitting parallel plain plate C (cover glass, etc.) disposed between the object O and the lens group G1 is equal to 0 mm (when the light-transmitting parallel plain plate C is not disposed), and TL0 denotes a distance on the optical axis from the object O (a focal point surface facing the object side in the microscope objective lens OL) to a lens rear end surface (a surface (the 21th surface in FIG. 1) facing the image of the third cemented lens CL23) of the whole microscope objective lens OL, in case that thickness of the light-transmitting parallel plain plate C (cover glass, etc.) is equal to 0 mm (when the light-transmitting parallel plain plate C is not disposed).

The conditional expression (3) defines a working distance of the microscope objective lens OL. In case of deceeding the lower limit of the conditional expression (3), a distance between the microscope objective lens OL and the object O excessively becomes short, thereby operability of a microscope equipped with the microscope objective lens OL becomes worse, thus it is not preferable. Note that by setting the lower limit of the conditional expression (3) to 0.12, this enables to further have the advantageous effect of the present application. On the contrary, in case of exceeding the upper limit of the conditional expression (3), it is insufficient to secure an enough space from a surface facing the object O to a surface closest to the image in the microscope objective lens OL, thereby the number and thickness of arrangeable lenses are limited, thus it is difficult to correct aspherical aberration and chromatic aberration. Note that by setting the upper limit of the conditional expression (3) to 0.18, it is possible to further have the advantageous effect of the present application.

The positive lens L2 which is disposed closer to the image of the positive meniscus lens L1 disposed closest to the object O has a function to keep the image surface plain by decreasing Petzval sum, in addition it is necessary to reduce generation of aspherical aberration, coma aberration, and chromatic aberration as much as possible. In order to correct chromatic aberration generated in the positive meniscus lens L1 closest to the object O and the positive lens L2 disposed closer to the image by the cemented lens and the diffractive optical element DOE which are disposed subsequently from them, it is preferable that the following conditional expression (4) is satisfied.

$$224 \leq ((nd1+nd2)/2) \times |fdoe/f| \leq 280 \quad (4)$$

where nd2 denotes refractive index to d-line of the glass material of the positive lens L2 disposed closer to the image of the positive meniscus lens L1 closest to the object O, f denotes a focal length of a whole microscope objective lens OL, and fdoe denotes a focal length of the diffractive optical element DOE.

The conditional expression (4) defines a ratio of appropriate refractive index of the positive meniscus lens L1 closest to the object O and the positive lens L2 disposed close to the image, against a focal length of the diffractive optical element DOE against a focal length of the whole microscope objective lens OL, in order to make various aberrations such as chromatic aberration, etc. appropriate. In case of deceeding the lower limit of the conditional expression (4), Petzval sum becomes large, therefore flatness of the image surface is not maintained and the lens surface becomes strongly-curved, thereby aspherical aberration and coma aberration, etc. are become worse. Or, a ratio of the focal length of the diffractive optical element DOE against that of the whole microscope objective lens OL excessively becomes small, thereby a diffraction grating pitch becomes fine, thus it becomes difficult to manufacture the diffractive optical element DOE, and it is not preferable. Note that by setting the lower limit of the conditional expression (4) to 235, this enables to further have the advantageous effect of the present application. On the contrary, in case of exceeding the upper limit of the conditional expression (4), this does not enable to sufficiently restrain chromatic aberration, especially second order dispersion. Or, since the focal length of the diffractive optical element DOE against the focal length of the whole microscope objective lens OL becomes too large, thereby achromatism of first order becomes insufficient, thus it is not preferable.

In case that an angle at which a light ray is incident on the diffractive optical surface D is approximately equal to 0 degree, this cause dihedral reflection within parallel plates (optical glasses L3 and L6) configuring the diffractive optical element DOE, and flare due to dihedral reflection on a parallel plate and an object surface configuring the diffractive optical element DOE. On the contrary, in case that an angle at which a light ray is incident on the diffractive surface D is excessively large, a diffraction efficiency of the diffractive optical element DOE lowers, this causes flare by generating unexpected diffractive light which is other than designed orders. Therefore, it is preferable to configure that the diffractive optical element DOE (diffractive optical surface D) is disposed in a location in which the following conditional expression (5) is satisfied.

$$4° \leq |\theta max| \leq 10° \quad (5)$$

where θmax denotes a maximum value of an angle at which a light ray having a maximum numerical aperture from a center of the object O is incident on the diffractive optical element DOE (diffractive optical surface D).

The conditional expression (5) defines a maximum incident angle of the light ray which is incident on the diffractive optical element DOE (diffractive optical surface D). In case of deceeding the lower limit of the conditional expression (5), this causes flare due to dihedral reflection, thus it is not preferable. Note that, by setting the lower limit of the conditional expression (5) to 5 degrees, this enables to further have the advantageous effect of the present application. On the contrary, in case of exceeding the upper limit of the conditional expression (5), this cause flare by generating unexpected diffractive light other than designed order, it is not preferable.

In the microscope objective lens OL in FIG. 1, regarding a diameter of a flux of light, each light ray of the followings is defined as a primary ray PR, such as a light ray emitted in a direction farthest from the optical axis OA among a light ray emitted from an on-axis object point and having a maximum aperture number and a light ray emitted from an off-axis object point, a light ray emitted in a direction closest to the optical axis OA by restraining with an intersection at which a light ray emitted from the on-axis object point and having the maximum aperture number crosses an appropriate lens surface (for example, a surface (the 2nd surface) closer to the image of the positive meniscus lens L1 in FIG. 1) in the lens group G1, and a light ray which travels in a center of a flux of light emitted from a maximum image height and which is determined with a most outside light ray of the flux of light defined when restraining with an intersection at which a light ray emitted from the on-axis object point and having the maximum aperture number with an appropriate lens surface (for example, a surface (the 21st surface) close to the image of the positive lens L14 of the third cemented lens CL23 in FIG. 1) in the second lens group G2.

In the microscope objective lens OL, it is preferable that the diffractive optical element DOE is configured to be disposed closer to the object O than a location the primary ray PR crosses the optical OA. With this arrangement, it is possible to effectively correct axial chromatic aberration. Furthermore, it is preferable that the diffractive optical element DOE is configured to be disposed closer to the object O than a location in which a diameter of a flux of light passing through the first lens group G1. With this arrangement, since reflected light generated in a parallel plate (the optical glasses L3 and L6 in FIG. 1) configuring the diffractive optical element DOE becomes a diverging light near the object surface, therefore the strength of flare lowers, thereby this does not hinder any observation.

The second lens group G2 has negative refractive power as a whole, and is composed of three cemented lens (achromatism lens) CL21, CL22, and CL23 which are configured to cement a positive lens and a negative lens each other. Refractive index of the negative lens L13 and the positive lens L14 which configures the third cemented lens CL23 disposed closest to the image among these lenses is configured so that the following conditional expression (6) is satisfied.

$$|nd3-nd4| \leq 0.13 \tag{6}$$

where nd3 denotes refractive index against d-line of a glass material of one of the negative lens L13 and the positive lens L14 which configures the third cemented lens CL23 disposed closest to the image in the second lens group G2, and nd4 denotes refractive index against d-line of a glass material of the other of the negative lens L13 and the positive lens L14 which configures the third cemented lens CL23 disposed closest to the image in the second lens group G2.

By satisfying the conditional expression (6), these cemented lenses CL22 and CL23 enable to preponderantly correct chromatic aberration, and additionally appropriately correct chromatic aberration of magnification.

It is preferable that the microscope objective lens OL is configured to enable to correct aberrations by mutually moving the second lens group G2 against the first lens group G1 in the optical axial direction OA in accordance with thickness (and refractive index) of the light-transmitting parallel plain plate C (cover glass or glass dish) disposed between the object O and the first lens group G1. With this arrangement, aberrations can be appropriately corrected against variation of the thickness (refractive index) of the light-transmitting parallel plain plate C.

It is preferable that the microscope objective lens OL is configured so that the following conditional expression (7) is satisfied.

$$vdmax \leq 85 \tag{7}$$

where vdmax denotes a maximum value of the Abbe number on the basis of d-line regarding a glass material of the positive lens which configures the microscope objective lens OL.

The conditional expression (7) defines the Abbe number of the positive lens included in the microscope objective lens OL. A glass material having an Abbe number exceeding the upper limit of the conditional expression (7) is a material having an anomalous-scattering characteristic such as fluorite etc., when such a material is used for a positive lens while using the diffractive optical element DOE, chromatic aberration is excessively corrected, thus it is not preferable.

The microscope objective lens OL according to the present embodiment is used for the microscope 1 as illustrated in FIG. 18. In FIG. 18, the microscope 1 is used to observe a test object 2 containing a specimen S, and comprises a first light source apparatus 6, a second light source 7, the microscope objective lens OL, a second objective lens 9, an eyepiece optical system 11 which leads a flux of light from the image formed by the second objective lens 9 to eyeballs of a user, and a stage 10 movable while supporting the test object 2. Focusing operation can be performed by moving this stage 10 in an optical axis direction of the microscope objective lens OL. Needless to say, by separately providing a focal point detecting mechanism, the amount of movement of the stage 10 is controlled based on output from the focal point detecting mechanism. Moreover, the microscope 1 is equipped with a body 15, and a first light source apparatus 6, a second light source apparatus 7, the microscope objective lens OL, the secondary objective lens 9, and the respective stage 10 is supported by this body 15.

Note that the microscope 1 comprises a first illumination optical system (transmitted-illumination optical system) 17 which illuminates the test object 2 using light emitted from the first light source apparatus 6, and a second illumination optical system (epi-illumination optical system) 18 which illuminates the test object 2 using light emitted from the second light source apparatus 7. At this point, regarding light emitted from the second light source apparatus 7, the objective lens 8 becomes part of the second illumination optical system 18, thus light from the second light source apparatus 7 is led to the microscope objective lens OL by the optical path synthetic member 16. In this optical path synthetic member 16, the optical axis and the neighborhood thereof of the microscope objective lens OL are light-transmitting, and it is appreciated that a mirror on which a reflection film is formed on an outer peripheral part is adopted, or a halfmirror is adopted instead. In case of the former, this enables to have dark field observations. In case of the latter, this enables to have light field observations using epi-illumination.

It is appreciated that imaging means is provided in a location in which an image is formed by the microscope objective lens OL and the second objective lens 9. Needless to say, it is appreciated that a flux of light from the microscope objective lens OL is divided by not shown optical-path splitting means, the second objective lens is separately provided, and imaging means is provided in a location in which an image is formed by the second objective lens. Moreover, it is appreciated that this configuration is applied to either an upright microscope or an inverted microscope. Furthermore, it is appreciated to adopt any one of the light source apparatus 6 and the second light source apparatus 7.

EXAMPLES

Hereinafter, four examples of the microscope objective lens OL according to the present embodiment are described. Note that regarding each reference signs assigned to in drawings of each example, some are assigned with the same reference signs in each example, however this is because of avoiding complicated explanations due to increasing the digit number of reference signs, thus they are independently used in each example. That is, even if assigned with the same reference signs shared in other drawings according to each example, this does not necessarily mean they are the same configuration elements.

In [General Data] in Tables indicated below, f means a focal length (mm) at d-line (wavelength λ=587.562 nm) of the microscope objective lens OL, N.A. means an aperture number, and β means magnification. Moreover, d0 (W.D.) means a working distance, that is, a distance on the optical axis from the object O to a vertex of a lens surface closest to the object O in the positive meniscus lens L1 disposed closest to the object O, except for thickness of the light-transmitting parallel plain plate C (cover glass, etc.).

In [Lens Data] in Tables, a surface number m means an order of an optical surface from a side of the object O, r means a radius of curvature of each optical surface, d means a distance (surface distance between each optical surface) on the optical axis from each optical surface to the next optical surface, nd and vd respectively mean refractive index and an Abbe number against d-line. The refractive index of air "1.00000" is omitted. Moreover, in [Lens Data], "*" means that a surface with this sign "*" is the diffractive optical surface D.

[Diffractive Surface Data] in Tables is indicated by the following expression, where Φ(h) means a phase function of the diffractive optical element DOE, h means a height from the optical axis, λ means a wavelength, C2 means a second-order phase coefficient, C4 means a fourth-order phase coefficient, C6 means a sixth-order phase coefficient, and C8 means an eighth-order phase coefficient. Note that in [Diffractive Surface Data], "E-n" (n is a whole number) means "×10$^{-n}$." For instance, −3.0092E−04 is equal to −3.0092×10$^{-4}$.

$$\Phi(h)=2\pi/\lambda \times (C2h^2+C4h^4+C6h^6+C8h^8) \quad (8)$$

Note that regarding the units of a radius of curvature r, a surface distance d, and the lengths, "mm" is generally used except on a specific request. However, in optical systems, equivalent optical performance can be obtained even if proportionally enlarged or proportionally shrunk, thus the units are not limited in "mm."

The diffractive optical surface D is formed with two ultraviolet-rays cured resin which are mutually different from each other, and resin having the following values of refractive index are used. Note that the resinous refractive index illustrates refractive index after resin are cured.

TABLE 1

(Resinous Refractive Index)

| | nC | nd | nF | ng |
|---|---|---|---|---|
| Low refractive index | 1.52330 | 1.52780 | 1.53910 | 1.54910 |
| High refractive index | 1.55380 | 1.55710 | 1.56500 | 1.57130 |

At this point, regarding respective resin, nC means refractive index regarding C-line (wavelength λ=656.273 nm), nd means refractive index regarding d-line (wavelength λ=587.562 nm), nF means refractive index regarding F-line (wavelength λ=486.133 nm), and ng means refractive index regarding g-line (wavelength λ=435.835 nm). A method for manufacturing a tight-bonded multiple layer diffractive optical element using these resin is described, for example, in an European patent application publication No. 1830204, and an European patent application publication No. 1830205. Note that it is preferable regarding these resin, an internal transmittivity ratio of light at wavelength of approximately 350 nm is greater than 0.5.

FIG. 2, etc. illustrate graphs showing various aberrations (spherical aberration, astigmatism, distortion, and coma aberration) of respective examples. In graphs showing spherical aberration and coma aberration, a solid-line shows d-line, a dotted-line shows C-line, a chain line shows F-line, a dash line shows g-line. Moreover, in a graph of spherical aberration, a vertical axis shows a value which standardized the maximum value of an entrance pupil radius as a value "1," and a horizontal axis shows a value (mm) of aberration of each light ray. In a graph of astigmatism, a solid-line shows a sagittal image surface and a dashed line shows a meridional image surface. Moreover, in a graph of astigmatism, a vertical axis shows an image height (mm) and a horizontal axis shows a value (mm) of the aberration. In a distortion diagram, a vertical axis shows an image height (mm) and a horizontal axis shows a rate of aberration with percentage (% value). In each examples shown here, a criterion of thickness of the light-transmitting parallel plain plate C (cover glass, etc.) disposed between the object O and the microscope objective lens OL (the first lens group G1) is set to 1 mm, refractive index thereof nd is set to 1.52216, and the Abbe number vd is set to 58.8.

The microscope objective lenses OL1 to OL4 in each following example are based on an infinity correction typed one, and are used with an imaging lens IL having data shown in FIG. 17 and Table 2. Note that in Table 2, m of the first column shows an order the optical surface counted from the object, r of the second column shows a radius of curvature of each optical surface, d of the third column shows a distance (surface distance) on the optical axis from each optical surface to the next optical surface, and nd of the fourth column and vd of the fifth column respectively show refractive index to d-line and an Abbe number. The refractive index 1.00000 of air is omitted.

TABLE 2

| m | r | d | nd | vd |
|---|---|---|---|---|
| 1 | 75.043 | 5.10 | 1.62280 | 57.0 |
| 2 | −75.043 | 2.00 | 1.74950 | 35.2 |
| 3 | 1600.580 | 7.50 | | |
| 4 | 50.256 | 5.10 | 1.66755 | 42.0 |
| 5 | −84.541 | 1.80 | 1.61266 | 44.4 |
| 6 | 36.911 | | | |

Note that this imaging lens IL is composed of, in order from the object, a first cemented lens CL31 composed of a biconvex lens L21 and a biconcave lens L22 cemented each other, and a second cemented lens CL32 composed of a biconvex lens L23 and a biconcave lens L24 cemented each other.

Example 1

Example 1 is described using FIGS. 1 to 4 and Tables 3 to 5. FIG. 1 used in the above-described explanation shows a configuration of the microscope objective lens OL1 according to Example 1. The microscope objective lens OL1 is an objective lens for observing an object O (specimen) disposed under the light-transmitting parallel plain plate C (cover glass, etc.), is configured to comprise, in order from the object O (light-transmitting parallel plain plate C), a first lens group G1 having positive refractive power, and a second lens group G2 having negative refractive power, and the diffractive optical element DOE is disposed in the first lens group G1.

The first lens group G1 is composed of, in order from the object O, a positive meniscus lens L1 having a concave surface facing the object O, a positive meniscus lens L2 having a concave surface facing the object O, a plain diffractive optical element DOE having a diffractive optical surface D, a cemented positive lens CL11 in which a biconvex lens L7 is cemented with a negative meniscus lens L8 having a concave surface facing the object O.

The second lens group G2 is composed of, in order from the object O, a cemented positive lens CL21 in which a negative meniscus lens L9 having a concave surface facing the image is cemented with a plano-convex lens having a convex surface facing the object O, a cemented negative lens CL22 in which a biconvex lens L11 is cemented with a concave lens L12 having a strongly-curved concave surface facing the image, and a cemented negative lens CL23 in which a biconcave lens L13 having a strongly-curved surface facing the object O is cemented with a biconvex lens L14.

TABLE 3

[General Data]

f = 10.23
N.A. = 0.6
d0 = 10.47
β = 20X

[Lens Data]

| Surface number m | Radius of curvature r | Surface distance d | Refractive index nd | Abbe number vd |
|---|---|---|---|---|
| 1 | −20.847 | 3.5 | 1.72916 | 54.7 |
| 2 | −12.102 | 0.2 | | |
| 3 | −122.112 | 3.4 | 1.64000 | 60.1 |
| 4 | −21.374 | 2.3 | | |
| 5 | 0.000 | 1.4 | 1.51633 | 64.1 |
| 6 | 0.000 | 0.1 | 1.55710 | 49.7 |
| 7* | 0.000 | 0.1 | 1.52780 | 33.4 |
| 8 | 0.000 | 1.4 | 1.51633 | 64.1 |
| 9 | 0.000 | 0.2 | | |
| 10 | 29.371 | 7.1 | 1.49782 | 82.6 |
| 11 | −17.798 | 1.5 | 1.67300 | 38.2 |
| 12 | −29.772 | d12(Variable) | | |
| 13 | 35.464 | 1.0 | 1.73800 | 32.3 |
| 14 | 13.603 | 4.6 | 1.49782 | 82.6 |
| 15 | 0.000 | 0.2 | | |
| 16 | 10.646 | 5.7 | 1.49782 | 82.6 |
| 17 | −48.100 | 4.0 | 1.67300 | 38.2 |
| 18 | 6.510 | 4.8 | | |
| 19 | −7.380 | 4.2 | 1.64000 | 60.1 |
| 20 | 18.604 | 5.2 | 1.67300 | 38.2 |
| 21 | −13.645 | | | |

[Diffractive Surface Data]
The 7th surface

C2 = −3.0092E−04
C4 = −1.4667E−07
C6 = 3.5429E−09
C8 = −2.0543E−11

In the microscope objective lens OL1 having such data, Table 4 illustrates values such as a working distance d0 (W.D.), a surface distance d12 (corresponding to a surface distance variable in Table 3, and a distance on the optical axis from the 12th surface to the 13th surface), and a distance TL on the optical axis from the object O to the lens rear end surface of the whole microscope objective lens OL1, in case that thicknesses of the light-transmitting parallel plain plate C (cover glass, etc.) are 0.0, 1.0, and 2.0 mm. That is, Table 4 shows each surface distance d0, d12 when moving the whole microscope objective lens OL1 and mutually moving the second lens group G2 against the first lens group G1 so that a focal length and aberrations are corrected, in case that the thickness of the light-transmitting parallel plain plate C changes. Furthermore, values (values corresponding to conditions) of the described above conditional expressions (1) to (7) in this microscope objective lens OL1 are shown in Table 5.

TABLE 4

| Thickness of parallel plate | d0(W.D.) | d12 | TL |
|---|---|---|---|
| 0 | 10.47 | 0.2 | 61.5 |
| 1 | 9.75 | 1.1 | 61.7 |
| 2 | 9.02 | 2.1 | 62.0 |

TABLE 5

(Values Corresponding To Conditional Expressions)

(1) nd1 = 1.72916
(2) vd1 = 54.7
(3) d00/TL0 = 0.1702
(4) ((nd1 + nd2)/2) × |fdoe/f| = 273.7
(5) |θmax| = 5.2
(6) |nd3 − nd4| = 0.03300
(7) vdmax = 82.6

As shown in Table 5, regarding the microscope objective lens OL1 according to Example 1, the conditional expressions (1) and (7) are all satisfied. Moreover, as shown in each graph showing aberrations of FIGS. 2 to 4, regarding the microscope objective lens OL1 according to Example 1, various aberrations are appropriately corrected within a range of C-line to g-line in each case that thicknesses of the light-transmitting parallel plain plate C (cover glass, etc.) are 0 to 2 mm.

As mentioned above, according to the microscope objective lens OL1 set forth in Example 1, various aberrations such as chromatic aberration, etc. are appropriately corrected, thereby it is possible to have an objective lens which has excellent optical performance, which has a sufficiently long working distance, and which corresponds to a variation of thickness (0 to 2 mm) of the cover glass, etc.

Example 2

Example 2 is described using FIGS. 5 to 8 and Tables 6 to 8. FIG. 5 shows a microscope objective lens OL2 according to Example 2. The microscope objective lens OL2 is an objective lens for observing an object O (specimen) disposed under the light-transmitting parallel plain plate C (cover glass, etc.), and is configured to comprise, in order from the object O (the light-transmitting parallel plain plate C), a first lens group G1 having positive refractive power, and a second lens group G2 having negative refractive power, and the diffractive optical element DOE is disposed in the first lens group G1.

The first lens group G1 is composed of, in order from the object O, a positive meniscus lens L1 having a concave surface facing the object O, a positive meniscus lens L2 having a concave surface facing the object O, a plain diffractive optical element DOE having a diffractive optical surface D, and a cemented positive lens CL11 in which a biconvex lens L7 is cemented with a negative meniscus lens L8 having a concave surface facing the object O.

The second lens group G2 is composed of, in order from the object O, a cemented positive lens CL21 in which a biconvex lens L9 and a biconcave lens L10 are cemented each other, a cemented negative lens CL22 in which a positive meniscus lens L11 having a concave surface facing the image is cemented with a negative meniscus lens L12 having a strongly-curved concave surface, and a cemented negative lens CL23 a biconcave lens L13 having a strongly-curved concave surface facing the object and a biconvex lens L14.

TABLE 6

[General Data]

f = 10.23
N.A. = 0.6
d0 = 10.67
β = 20X

[Lens Data]

| Surface number m | Radius of curvature r | Surface distance d | Refractive index nd | Abbe number vd |
|---|---|---|---|---|
| 1 | −18.590 | 3.0 | 1.72916 | 54.7 |
| 2 | −11.890 | 0.2 | | |
| 3 | −48.384 | 3.7 | 1.64000 | 60.1 |
| 4 | −16.220 | 3.6 | | |
| 5 | 0.000 | 1.4 | 1.51633 | 64.1 |
| 6 | 0.000 | 0.1 | 1.55710 | 49.7 |
| 7* | 0.000 | 0.1 | 1.52780 | 33.4 |
| 8 | 0.000 | 1.4 | 1.51633 | 64.1 |
| 9 | 0.000 | 0.2 | | |
| 10 | 31.851 | 7.2 | 1.49782 | 82.6 |
| 11 | −17.217 | 1.5 | 1.67300 | 38.2 |
| 12 | −26.746 | d12(Variable) | | |
| 13 | 21.627 | 5.3 | 1.49782 | 82.6 |
| 14 | −25.940 | 1.0 | 1.73800 | 32.3 |
| 15 | 32.526 | 1.0 | | |
| 16 | 9.356 | 4.9 | 1.49782 | 82.6 |
| 17 | 76.176 | 3.1 | 1.67300 | 38.2 |
| 18 | 6.032 | 6.6 | | |
| 19 | −6.852 | 1.5 | 1.64000 | 60.1 |
| 20 | 21.683 | 5.0 | 1.67300 | 38.2 |
| 21 | −10.611 | | | |

TABLE 6-continued

[Diffractive surface data]
The 7th surface

C2 = −3.2837E−04
C4 = 3.3809E−07
C6 = 1.4552E−09
C8 = −1.2623E−11

In the microscope objective lens OL2 having such data, Table 7 illustrates values such as a working distance d0 (W.D.) in case that thicknesses of the light-transmitting parallel plain plate C (cover glass, etc.) is 0.0, 1.0, and 2.0 mm, a surface distance d12 (corresponding to a surface distance variable in Table 6, and a distance on the optical axis from the 12th surface to the 13th surface), and a distance TL on the optical axis from the object O to the lens rear end surface of the whole microscope objective lens OL2. That is, Table 7 shows each surface distance d0, d12 when moving the whole microscope objective lens OL2 and mutually moving the second lens group G2 against the first lens group G1 so that a focal length and aberrations are corrected, in case that the thickness of the light-transmitting parallel plain plate C changes. Furthermore, Table 8 shows values (values corresponding to conditions) of the above mentioned conditional expressions (1) to (7) in the microscope objective lens OL2.

TABLE 7

| Thickness of parallel plate | d0(W.D.) | d12 | TL |
|---|---|---|---|
| 0 | 10.67 | 0.2 | 61.7 |
| 1 | 9.93 | 1.1 | 61.8 |
| 2 | 9.19 | 2.2 | 62.0 |

TABLE 8

(Values Corresponding To Conditional Expressions)

(1) nd1 = 1.72916
(2) vd1 = 54.7
(3) d00/TL0 = 0.1730
(4) ((nd1 + nd2)/2) × |fdoe/f| = 250.6
(5) |θmax| = 5.1
(6) |nd3 − nd4| = 0.03300
(7) vdmax = 82.6

As shown from Table 8, regarding the microscope objective lens OL2 according to Example 2 that the conditional expressions (1) to (7) are all satisfied. Moreover, as shown in each graph showing aberrations of FIGS. 6 to 8, regarding the microscope objective lens OL2 according to Example 2, various aberrations are appropriately corrected within a range of C-line to g-line in each case that thicknesses of the light-transmitting parallel plain plate C (cover glass, etc.) are 0 to 2 mm.

As mentioned above, according to the microscope objective lens OL2 set forth in Example 2, various aberrations such as chromatic aberration, etc. are appropriately corrected, thereby it is possible to have an objective lens which has excellent optical performance, which has a sufficiently long working distance, and which corresponds to a variation of thickness (0 to 2 mm) of the cover glass, etc.

Example 3

Example 3 is described using FIGS. 9 to 12 and Tables 9 to 11. FIG. 9 illustrates a microscope objective lens OL3 according to Example 3. The microscope objective lens OL3 is an objective lens for observing an object O (specimen) disposed under the light-transmitting parallel plain plate C (cover glass, etc.), is configured to comprise, in order from the object O (the light-transmitting parallel plain plate C), a first lens group G1 having positive refractive power, and a second lens group G2 having negative refractive power, and the diffractive optical element DOE is disposed in the first lens group G1.

The first lens group G1 is composed of, in order from the object O, a positive meniscus lens L1 having a concave surface facing the object O, a positive meniscus lens L2 having a concave surface facing the object O, a plain diffractive optical element DOE having the diffractive optical surface D, a cemented positive lens CL11 in which a negative meniscus lens L7 having a concave surface facing the object is cemented with a biconvex lens L8, and a biconvex lens L9.

The second lens group G2 is composed of, in order from the object O, a cemented negative lens CL21 in which a biconcave lens L10 and a biconvex lens L11 are cemented each other, a cemented negative lens CL22 in which a plano-convex lens L12 having a plain surface facing the image is cemented with a plano-concave lens L13 having a strongly-curved concave surface and a plain surface facing the object O, and a cemented negative lens CL23 in which a biconcave lens L14 having an strongly-curved concave surface facing the object O is cemented with a biconcave lens L15.

TABLE 9

[General Data]

f = 10.22
N.A. = 0.6
d0 = 9.77
β = 20X (Lens Data)

| Surface number m | Radius of curvature r | Surface distance d | Refractive index nd | Abbe number vd |
|---|---|---|---|---|
| 1 | −22.635 | 3.2 | 1.72916 | 54.7 |
| 2 | −13.399 | 0.2 | | |
| 3 | −200.000 | 3.5 | 1.72916 | 54.7 |
| 4 | −20.498 | 0.2 | | |
| 5 | 0.000 | 1.4 | 1.51633 | 64.1 |
| 6 | 0.000 | 0.1 | 1.55710 | 49.7 |
| 7* | 0.000 | 0.1 | 1.52780 | 33.4 |
| 8 | 0.000 | 1.4 | 1.51633 | 64.1 |
| 9 | 0.000 | 0.2 | | |
| 10 | 46.706 | 1.0 | 1.67300 | 38.2 |
| 11 | 17.146 | 6.1 | 1.49782 | 82.6 |
| 12 | −38.701 | 0.2 | | |
| 13 | 28.341 | 4.6 | 1.59240 | 68.3 |
| 14 | −41.620 | d14(Variable) | | |
| 15 | −30.000 | 1.0 | 1.67300 | 38.2 |
| 16 | 24.232 | 5.0 | 1.49782 | 82.6 |
| 17 | −25.653 | 0.2 | | |
| 18 | 10.736 | 5.5 | 1.49782 | 82.6 |
| 19 | 0.000 | 2.3 | 1.67300 | 38.2 |
| 20 | 6.019 | 4.1 | | |
| 21 | −7.521 | 6.5 | 1.61340 | 44.3 |
| 22 | 23.233 | 5.4 | 1.73800 | 32.3 |
| 23 | −18.750 | | | |

[Diffractive Surface Data]
The 7$^{th}$ surface

C2 = −3.0972E−04
C4 = 6.4786E−09

TABLE 9-continued

C6 = 6.1382E−09
C8 = −3.6132E−11

In the microscope objective lens OL3 having such data, Table 10 illustrates values showing a working distance d0 (W.D.) in case that thicknesses of the light-transmitting parallel plain plate C (cover glass, etc.) is 0.0, 1.0, and 2.0 mm, a surface distance d14 (corresponding to a surface distance variable in Table 9, and a distance on the optical axis from the 14th surface to the 15th surface), and a distance TL on the optical axis from the object O to the lens rear end surface of the whole microscope objective lens OL3. That is, Table 10 shows each surface distance d0, d12 when moving the whole microscope objective lens OL3 and mutually moving the second lens group G2 against the first lens group G1 so that a focal length and aberrations are corrected, in case that the thickness of the light-transmitting parallel plain plate C changes. Furthermore, values (values corresponding to conditions) of the conditional expressions (1) to (7) in the microscope objective lens OL3 are shown in Table 11.

TABLE 10

| Thickness of parallel plate | d0(W.D.) | d14 | TL |
|---|---|---|---|
| 0 | 9.77 | 0.4 | 62.4 |
| 1 | 9.00 | 0.8 | 62.0 |
| 2 | 8.23 | 1.2 | 61.6 |

TABLE 11

(Values Corresponding To Conditional Expressions)

(1) nd1 = 1.72916
(2) vd1 = 54.7
(3) d00/TL0 = 0.1565
(4) ((nd1 + nd2)/2) × |fdoe/f| = 273.1
(5) |θmax| = 5.1
(6) |nd3 − nd4| = 0.12460
(7) vdmax = 82.6

As shown in Table 11, in the microscope objective lens OL3 according to Example 3, the conditional expressions (1) to (7) are all satisfied. Moreover, as shown in each graph showing aberrations of FIGS. 10 to 12, regarding the microscope objective lens OL3 according to Example 3, various aberrations are appropriately corrected within a range of C-line to g-line in each case that thicknesses of the light-transmitting parallel plain plate C (cover glass, etc.) are 0 to 2 mm.

As mentioned above, according to the microscope objective lens OL3 set forth in Example 3, various aberrations such as chromatic aberration, etc. are appropriately corrected, thereby it is possible to have an objective lens which has excellent optical performance, which has a sufficiently long working distance, and which can correspond to a variation of thickness (0 to 2 mm) of the cover glass, etc. Moreover, the microscope objective lens OL3 is configured so that a positive single lens L9 is added in the first lens group G1, thus, it is possible to individually share power of the positive lens which configures the microscope objective lens OL3. Therefore, spherical aberration can be more appropriately corrected, and a numerical aperture can be enlarged.

Example 4

Example 4 is described using FIGS. 13 to 16 and Tables 12 to 14. FIG. 13 illustrates a microscope objective lens OL4 according to Example 4. The microscope objective lens OL4 is an objective lens for observing an object O (specimen) disposed under the light-transmitting parallel plain plate C, comprises, in order from the object O (the light-transmitting parallel plain plate C), a first lens group G1 having positive refractive power, and a second lens group G2 having negative refractive power, and the diffractive optical element DOE is disposed in the first lens group G1.

The first lens group G1 is composed of, in order from the object O (the light-transmitting parallel plain plate C), a positive meniscus lens L1 having a concave surface facing the object O, a positive meniscus lens L2 having a concave surface facing the object O, a plain diffractive optical element DOE having the diffractive optical surface D, a cemented positive lens CL11 in which a negative meniscus lens L7 having a concave surface facing the image is cemented with a biconvex lens L8, and a biconvex lens L9.

The second lens group G2 is configured to comprise, in order from the object O, a cemented negative lens CL21 in which a biconcave lens L10 and a biconvex lens L11 are cemented each other, a cemented negative lens CL22 in which a plano-convex lens L12 having a plain surface facing the image is cemented with a plano-concave lens L13 having a plain surface facing the object O and a strongly-curved concave surface facing the image, and a cemented negative lens CL23 in which a biconcave lens L14 having a strongly-curved concave surface facing the object O is cemented with a biconvex lens L15.

TABLE 12

[General Data]

f = 10.20
N.A. = 0.7
d0 = 7.73
β = 20X

[Lens Data]

| Surface number m | Radius of curvature r | Surface distance d | Refractive index nd | Abbe number νd |
|---|---|---|---|---|
| 1 | −17.092 | 3.2 | 1.72916 | 54.7 |
| 2 | −11.137 | 0.2 | | |
| 3 | −100.000 | 3.7 | 1.72916 | 54.7 |
| 4 | −18.366 | 0.2 | | |
| 5 | 0.000 | 1.4 | 1.51633 | 64.1 |
| 6 | 0.000 | 0.1 | 1.55710 | 49.7 |
| 7* | 0.000 | 0.1 | 1.52780 | 33.4 |
| 8 | 0.000 | 1.4 | 1.51633 | 64.1 |
| 9 | 0.000 | 0.2 | | |
| 10 | 181.144 | 1.0 | 1.67300 | 38.2 |
| 11 | 20.601 | 7.7 | 1.49782 | 82.6 |
| 12 | −23.081 | 0.2 | | |
| 13 | 31.770 | 5.4 | 1.59240 | 68.4 |
| 14 | −37.432 | d14(Variable) | | |
| 15 | −30.000 | 1.0 | 1.67300 | 38.2 |
| 16 | 34.642 | 5.2 | 1.49782 | 82.6 |
| 17 | −29.363 | 0.2 | | |
| 18 | 11.510 | 5.6 | 1.49782 | 82.6 |
| 19 | 0.000 | 2.6 | 1.67300 | 38.2 |
| 20 | 6.940 | 5.2 | | |
| 21 | −8.250 | 4.6 | 1.61340 | 44.3 |
| 22 | 26.357 | 4.9 | 1.73800 | 32.3 |
| 23 | −17.294 | | | |

TABLE 12-continued

[Diffractive surface data]
The 7$^{th}$ surface

C2 = −3.2148E−04
C4 = −3.1555E−07
C6 = 9.7481E−09
C8 = −5.5669E−11

In the microscope objective lens OL4 having such data, Table 13 illustrates values such as a working distance d0 (W.D.), a surface distance d14 (corresponding to a surface distance variable in Table 12, and a distance on the optical axis from the 14th surface to the 15th surface), and a distance TL on the optical axis from the object O to the lens rear end surface of the whole microscope objective lens OL4, in case that thicknesses of the light-transmitting parallel plain plate C (cover glass, etc.) is 0.0, 1.0, and 2.0 mm. That is, Table 13 shows each surface distance d0, d14 when moving the whole microscope objective lens OL4 and mutually moving the second lens group G2 against the first lens group G1 so that a focal length and aberrations are corrected, in case that the thickness of the light-transmitting parallel plain plate C changes. Furthermore, values (values corresponding to conditions) of the conditional expressions (1) to (7) in the microscope objective lens OL4 are shown in Table 14.

TABLE 13

| Thickness of parallel plate | d0(W.D.) | d14 | TL |
|---|---|---|---|
| 0 | 7.73 | 0.4 | 62.2 |
| 1 | 6.96 | 0.9 | 62.0 |
| 2 | 6.17 | 1.6 | 61.8 |

TABLE 14

(Values Corresponding To Conditional Expressions)

(1) nd1 = 1.72916
(2) vd1 = 54.7
(3) d00/TL0 = 0.1243
(4) ((nd1 + nd2)/2) × |fdoe/f| = 263.6
(5) |θmax| = 7.6
(6) |nd3 − nd4| = 0.12460
(7) vdmax = 82.6

As shown in Table 14, in the microscope objective lens OL4 according to Example 4, the conditional expressions (1) to (7) are all satisfied. Moreover, as shown in each graph showing aberrations of FIGS. 14 to 16, regarding the microscope objective lens OL4 according to Example 4, various aberrations are appropriately corrected within a range of C-line to g-line in each case that thicknesses of the light-transmitting parallel plain plate C (cover glass, etc.) are 0 to 2 mm.

As mentioned above, according to the microscope objective lens OL4 set forth in Example 4, various aberrations such as chromatic aberration, etc. are appropriately corrected, thereby it is possible to have an objective lens which has excellent optical performance, which has a sufficiently long working distance, and which can correspond to a variation of thickness (0 to 2 mm) of the cover glass, etc. Moreover, the positive single lens L9 is configured so that a positive single lens L9 is added in the first lens group G1, thus it is possible to individually share power of the positive lens which configures the microscope objective lens OL4. Therefore, spherical aberration can be appropriately corrected and a numerical aperture can be enlarged.

Examples according to the present embodiment are described as above, the scope of the present invention is not limited in what was described in the Examples described above. For example, in the above described examples, the positive lens L2 disposed close to the image of the positive meniscus lens L1 which configures the first lens group G1, is composed of the positive meniscus lens having the concave surface facing the object O, however this is not limited as described above, it is appreciated this is composed of a plano-convex lens having a plain surface facing the object O, or a biconvex lens, etc.

EXPLANATION OF NUMERALS AND CHARACTERS

OL (OL1 to OL4) Microscope objective lens
G1 First lens group
G2 Second lens group
L1 Positive meniscus lens
L2 Positive lens
DOE Diffractive optical element
D Diffractive optical surface
CL21 First cemented lens
CL22 Second cemented lens
CL23 Third cemented lens
C Light-transmitting parallel plain plate (cover glass and glass dish)

The invention claimed is:

1. An objective lens comprising, in order from an object, a first lens group having positive refractive power and a second lens group having negative refractive power,
the first lens group including, in order from the object, a positive meniscus lens having a concave surface facing the object, a positive lens disposed adjacent to an image side of the positive meniscus lens, and a diffractive optical element which has a diffractive optical surface,
the second lens group being composed of at least one cemented lens configured with a positive lens and a negative lens cemented to each other, and
the following conditional expressions being satisfied:

$$0.11 \le d00/TL0 \le 0.19$$

$$224 \le ((nd1+nd2)/2) \times |fdoe/f| \le 280$$

where d00 denotes a distance on the optical axis from the object to a surface facing the object of the positive meniscus lens,
TL0 denotes a distance on the optical axis from the object to a rear end lens surface of the whole objective lens,
nd1 denotes a refractive index at d-line of a glass material of the positive meniscus lens
nd2 denotes a refractive index at d-line of the glass material of the positive lens of the first lens group,
f denotes a focal length of the whole objective lens, and
fdoe denotes a focal length of the diffractive optical element.

2. An objective lens according to claim 1, wherein the following conditional expressions are satisfied:

$$1.7 \le nd1$$

$$50 \le vd1$$

where vd1 denotes an Abbe number at d-line of the glass material of the positive meniscus lens.

3. An objective lens according to claim 1, wherein the following conditional expression is satisfied:

$$4° \le |\theta max| \le 10°$$

where θmax denotes a maximum value of an angle, at which a light ray which corresponds to a maximum numerical aperture from a center of the object, is incident on the diffractive optical element.

4. An objective lens according to claim 1, wherein the following conditional expression is satisfied:

$$|nd3-nd4| \le 0.13$$

where nd3 denotes a refractive index at d-line of a glass material of one of two lenses which configure the cemented lens of the second lens group closest to an image, and
nd4 denotes refractive index at d-line of a glass material of the other of the two lenses which configure the cemented lens of the second lens group closest to the image.

5. An objective lens according to claim 1, wherein the second lens group can move relative to the first lens group in an optical axis direction depending on thickness of a light-transmitting member disposed between the object and the first lens group so that aberration can be corrected.

6. An objective lens according to claim 1, wherein the following conditional expression is satisfied:

$$vdmax \le 85$$

where vdmax denotes a maximum value of the Abbe number at d-line for the glass material of the positive lens of the first lens group.

7. An objective lens according to claim 1, wherein the second lens group is composed of, in order from the object, a first cemented lens which is configured with a positive lens and a negative lens cemented to each other, a second cemented lens which is configured with a positive lens having a convex surface facing the object and a negative lens having a concave surface facing an image, a third cemented lens which is configured with a negative lens having a concave surface facing the object side and a positive lens having a convex surface facing the image.

8. An objective lens according to claim 1, wherein the diffractive optical element is disposed closer to the object than a location at which a primary ray crosses the optical axis.

9. An objective lens according to claim 1, wherein the diffractive optical element is disposed closer to the object than a location at which a diameter of a flux of light passing through the first lens group becomes largest.

10. A microscope comprising an objective lens according to claim 1.

11. An objective lens comprising, in order from an object, a first lens group having positive refractive power and a second lens group having negative refractive power,
the first lens group including, in order from the object, a positive meniscus lens having a concave surface facing the object, a positive lens disposed adjacent to an image side of the positive meniscus lens, and a diffractive optical element which has a diffractive optical surface,
the second lens group being composed of at least one cemented lens configured with a positive lens and a negative lens cemented to each other,
the following conditional expression being satisfied:

$$0.11 \le d00/TL0 \le 0.19$$

where d00 denotes a distance on the optical axis from the object to a surface facing the object of the positive meniscus lens, and TL0 denotes a distance on the optical axis from the object to a rear end lens surface of the whole objective lens, and wherein the second lens group can move relative to the first lens group in an optical axis direction depending on thickness of a light-transmitting member disposed between the object and the first lens group so that aberration can be corrected.

12. An objective lens according to claim 11, wherein the following conditional expressions are satisfied:

$$1.7 \leq nd1$$

$$50 \leq vd1$$

where nd1 denotes a refractive index at d-line of a glass material of the positive meniscus lens, and vd1 denotes an Abbe number at d-line of the glass material of the positive meniscus lens.

13. An objective lens according to claim 11, wherein the following conditional expression is satisfied:

$$4° \leq |\theta max| \leq 10°$$

where θmax denotes a maximum value of an angle, at which a light ray which corresponds to a maximum numerical aperture from a center of the object, is incident on the diffractive optical element.

14. An objective lens according to claim 11, wherein the following conditional expression is satisfied:

$$|nd3-nd4| \leq 0.13$$

where nd3 denotes a refractive index at d-line of a glass material of one of two lenses which configure the cemented lens of the second lens group closest to an image, and nd4 denotes refractive index at d-line of a glass material of the other of the two lenses which configure the cemented lens of the second lens group closest to the image.

15. An objective lens according to claim 11, wherein the following conditional expression is satisfied:

$$vdmax \leq 85$$

where vdmax denotes a maximum value of the Abbe number at d-line for the glass material of the positive lens of the first lens group.

16. An objective lens according to claim 11, wherein the second lens group is composed of, in order from the object, a first cemented lens which is configured with a positive lens and a negative lens cemented to each other, a second cemented lens which is configured with a positive lens having a convex surface facing the object and a negative lens having a concave surface facing an image, a third cemented lens which is configured with a negative lens having a concave surface facing the object side and a positive lens having a convex surface facing the image.

17. An objective lens according to claim 11, wherein the diffractive optical element is disposed closer to the object than a location at which a primary ray crosses the optical axis.

18. An objective lens according to claim 11, wherein the diffractive optical element is disposed closer to the object than a location at which a diameter of a flux of light passing through the first lens group becomes largest.

19. A microscope comprising an objective lens according to claim 11.

20. An objective lens comprising, in order from an object, a first lens group having positive refractive power and a second lens group having negative refractive power, the first lens group including, in order from the object, a positive meniscus lens having a concave surface facing the object, a positive lens disposed adjacent to an image side of the positive meniscus lens, and a diffractive optical element which has a diffractive optical surface, the second lens group being composed of at least one cemented lens configured with a positive lens and a negative lens cemented to each other, the following conditional expression being satisfied:

$$0.11 \leq d00/TL0 \leq 0.19$$

where d00 denotes a distance on the optical axis from the object to a surface facing the object of the positive meniscus lens, and TL0 denotes a distance on the optical axis from the object to a rear end lens surface of the whole objective lens, and wherein the second lens group is composed of, in order from the object, a first cemented lens which is configured with a positive lens and a negative lens cemented to each other, a second cemented lens which is configured with a positive lens having a convex surface facing the object and a negative lens having a concave surface facing an image, a third cemented lens which is configured with a negative lens having a concave surface facing the object side and a positive lens having a convex surface facing the image.

21. An objective lens according to claim 20, wherein the following conditional expressions are satisfied:

$$1.7 \leq nd1$$

$$50 \leq vd1$$

where nd1 denotes a refractive index at d-line of a glass material of the positive meniscus lens, and vd1 denotes an Abbe number at d-line of the glass material of the positive meniscus lens.

22. An objective lens according to claim 20, wherein the following conditional expression is satisfied:

$$4° \leq |\theta max| \leq 10°$$

where θmax denotes a maximum value of an angle, at which a light ray which corresponds to a maximum numerical aperture from a center of the object, is incident on the diffractive optical element.

23. An objective lens according to claim 20, wherein the following conditional expression is satisfied:

$$|nd3-nd4| \leq 0.13$$

where nd3 denotes a refractive index at d-line of a glass material of one of two lenses which configure the cemented lens of the second lens group closest to an image, and nd4 denotes refractive index at d-line of a glass material of the other of the two lenses which configure the cemented lens of the second lens group closest to the image.

24. An objective lens according to claim 20, wherein the following conditional expression is satisfied:

$$vdmax \leq 85$$

where vdmax denotes a maximum value of the Abbe number at d-line for the glass material of the positive lens of the first lens group.

25. An objective lens according to claim 20, wherein the diffractive optical element is disposed closer to the object than a location at which a primary ray crosses the optical axis.

26. An objective lens according to claim 20, wherein the diffractive optical element is disposed closer to the object than a location at which a diameter of a flux of light passing through the first lens group becomes largest.

27. A microscope comprising an objective lens according to claim 20.

* * * * *